US009645003B2

(12) United States Patent
Malinovskiy

(10) Patent No.: US 9,645,003 B2
(45) Date of Patent: May 9, 2017

(54) EFFICIENT DISPERSION CORRECTION FOR FMCW-RADAR IN A PIPE

(71) Applicant: Endress + Hauser GmbH + Co. KG, Maulburg (DE)

(72) Inventor: Alexey Malinovskiy, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 273 days.

(21) Appl. No.: 14/620,389

(22) Filed: Feb. 12, 2015

(65) Prior Publication Data

US 2015/0233750 A1    Aug. 20, 2015

(30) Foreign Application Priority Data

Feb. 14, 2014   (DE) ........................ 10 2014 101 904

(51) Int. Cl.
*G01S 13/88* (2006.01)
*G01F 23/284* (2006.01)
(Continued)

(52) U.S. Cl.
CPC ............ *G01F 23/284* (2013.01); *G01S 7/023* (2013.01); *G01S 7/354* (2013.01); *G01S 13/34* (2013.01); *G01S 13/88* (2013.01)

(58) Field of Classification Search
CPC ................................ G01S 13/88; G01F 23/284
(Continued)

(56) References Cited

U.S. PATENT DOCUMENTS 5,406,842 A * 4/1995 Locke .................. G01F 23/284
324/643
6,107,957 A * 8/2000 Cramer ................ G01F 23/284
342/124
(Continued)

FOREIGN PATENT DOCUMENTS

EP         2166321 A2      3/2010

OTHER PUBLICATIONS

German Search Report, German PTO, Munich, Dec. 2, 2014.
(Continued)

*Primary Examiner* — Peter Bythrow
(74) *Attorney, Agent, or Firm* — Bacon & Thomas, PLLC

(57) ABSTRACT

A method for determining a distance to a surface of a medium or to another radar target in a pipe by means of a radar measurement apparatus. Transmitting within the pipe a radar transmission signal frequency modulated according to the FMCW principle, receiving a radar received signal reflected on the surface of the medium or on the other radar target in the pipe back to the radar measurement apparatus, mixing the radar received signal with the radar transmission signal or a signal derived therefrom and producing an intermediate signal. Determining a frequency spectrum of the intermediate signal or a signal derived therefrom by means of fast Fourier transformation and detecting the position of the frequency peak in the frequency spectrum. Determining a dispersion correction for removing, respectively lessening, dispersion effects, applying the dispersion correction to the intermediate frequency signal or to a signal derived therefrom and producing a dispersion corrected signal, and determining the position of the frequency peak in the frequency spectrum of the dispersion corrected signal anew by introducing a number of frequency support points in the region of the previously detected frequency peak, determining the respective frequency amplitudes selectively (Continued)

at the newly introduced frequency support points, and ascertaining the position of the frequency peak in the frequency spectrum of the dispersion corrected signal using the frequency amplitudes at the newly introduced frequency support points.

17 Claims, 8 Drawing Sheets

(51) Int. Cl.
    *G01S 7/02*     (2006.01)
    *G01S 13/34*     (2006.01)
    *G01S 7/35*     (2006.01)

(58) Field of Classification Search
    USPC ........................................................ 342/124
    See application file for complete search history.

(56) References Cited

U.S. PATENT DOCUMENTS

| | | | | |
|---|---|---|---|---|
| 7,355,548 B2* | 4/2008 | Larsson | ................ | G01F 23/284 342/124 |
| 8,271,212 B2* | 9/2012 | Sai | ........................ | G01F 23/284 702/103 |
| 2004/0145510 A1* | 7/2004 | Edvardsson | .......... | G01F 23/284 342/5 |
| 2005/0001761 A1* | 1/2005 | Kliewer | .................. | G01S 7/352 342/174 |
| 2007/0046528 A1* | 3/2007 | Larsson | ................ | G01F 23/284 342/124 |
| 2007/0236385 A1* | 10/2007 | Kleman | ................ | G01F 23/284 342/124 |
| 2009/0212997 A1* | 8/2009 | Michalski | ............. | G01F 23/284 342/137 |
| 2009/0235736 A1* | 9/2009 | Spanke | ................ | G01F 23/2962 73/290 V |
| 2010/0070207 A1* | 3/2010 | Sai | ........................ | G01F 23/284 702/55 |
| 2011/0181458 A1* | 7/2011 | Feil | ........................ | G01F 23/284 342/124 |
| 2012/0007768 A1* | 1/2012 | Hemmendorff | ....... | G01F 23/284 342/124 |
| 2014/0085132 A1* | 3/2014 | Jirskog | ................. | G01F 23/284 342/124 |
| 2015/0160066 A1* | 6/2015 | Sai | ........................ | G01F 23/284 342/21 |

OTHER PUBLICATIONS

Prazise Radarfullstandsmessungen in Schwallrohren ("Precise Radar Filling Level Measurements in Still Pipes"), Technisches Messen 77 (2010), pp. 381-393, in German.

\* cited by examiner

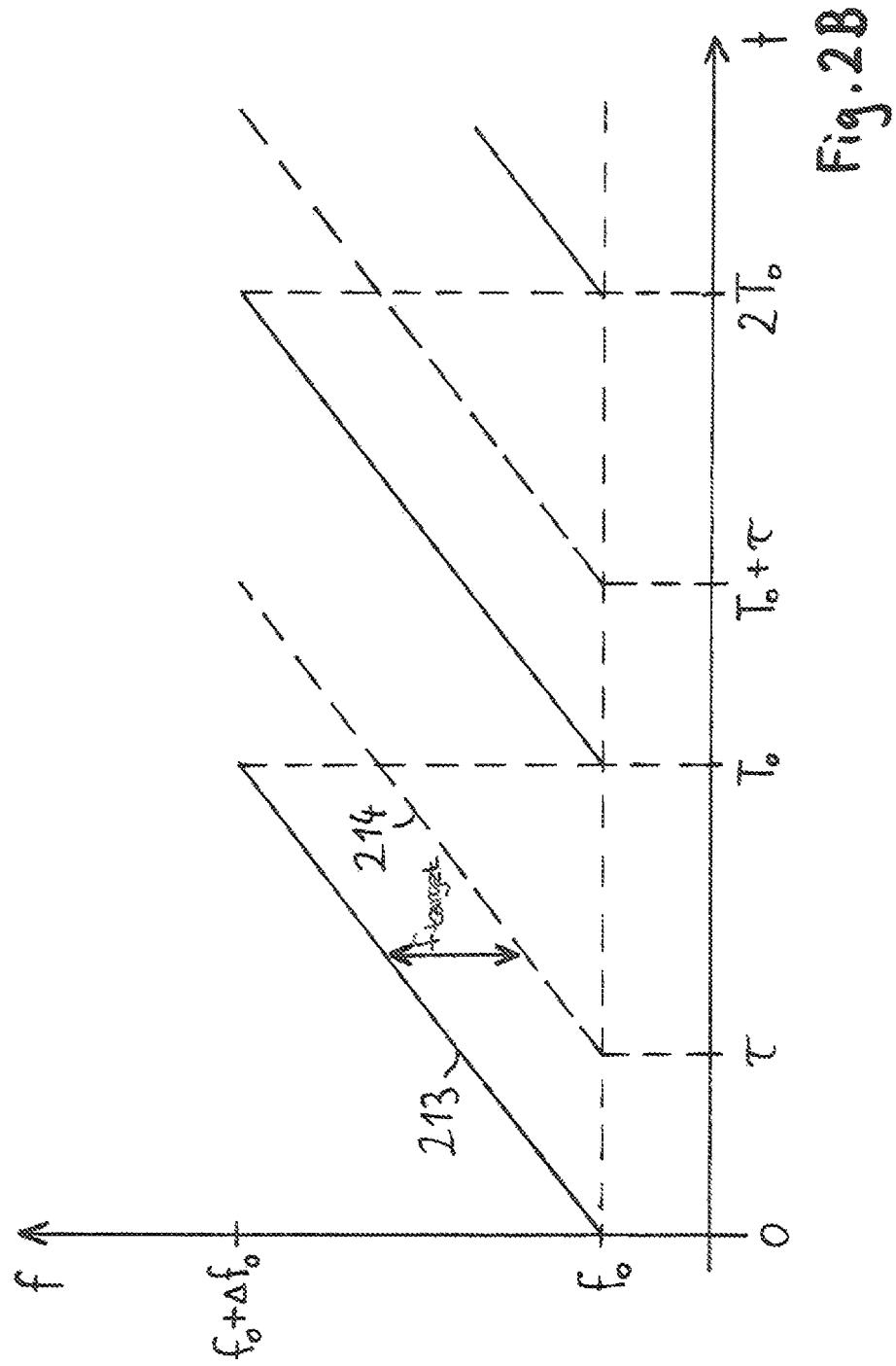

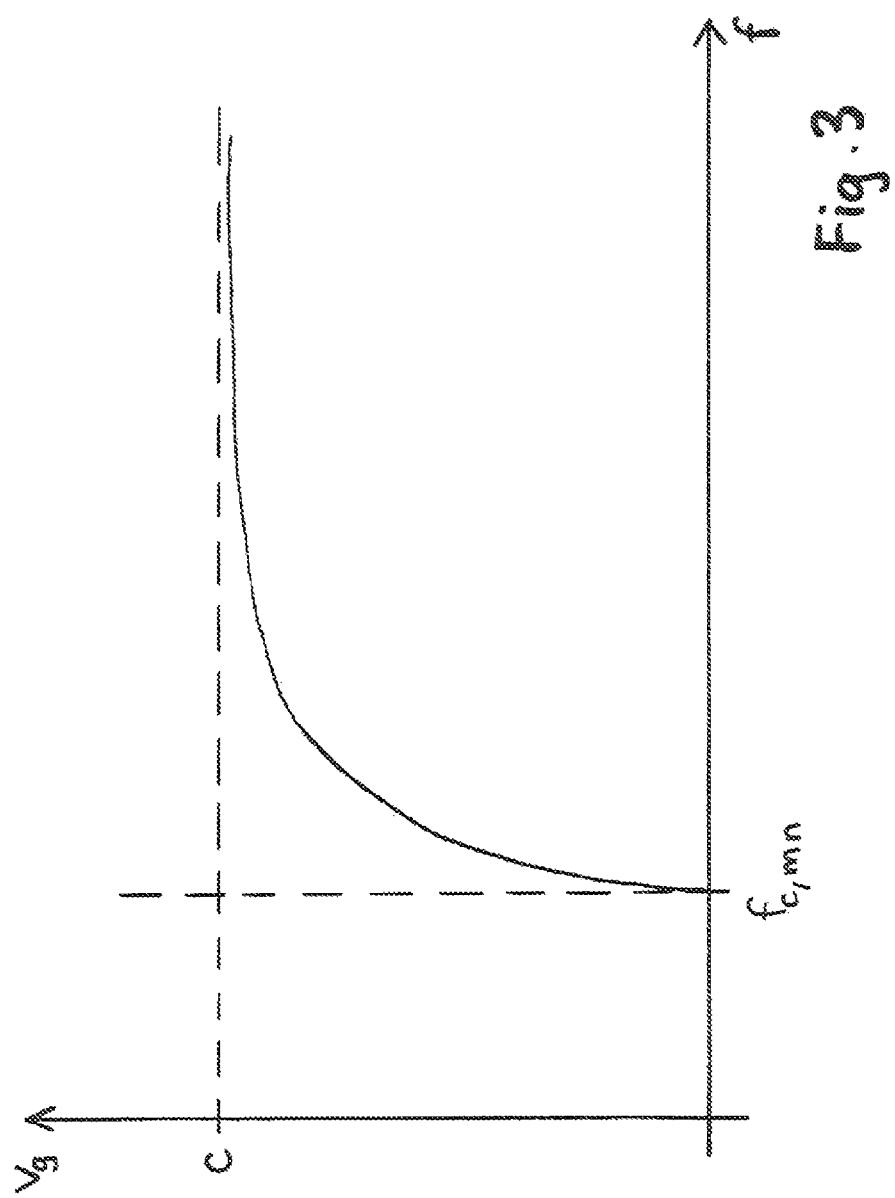

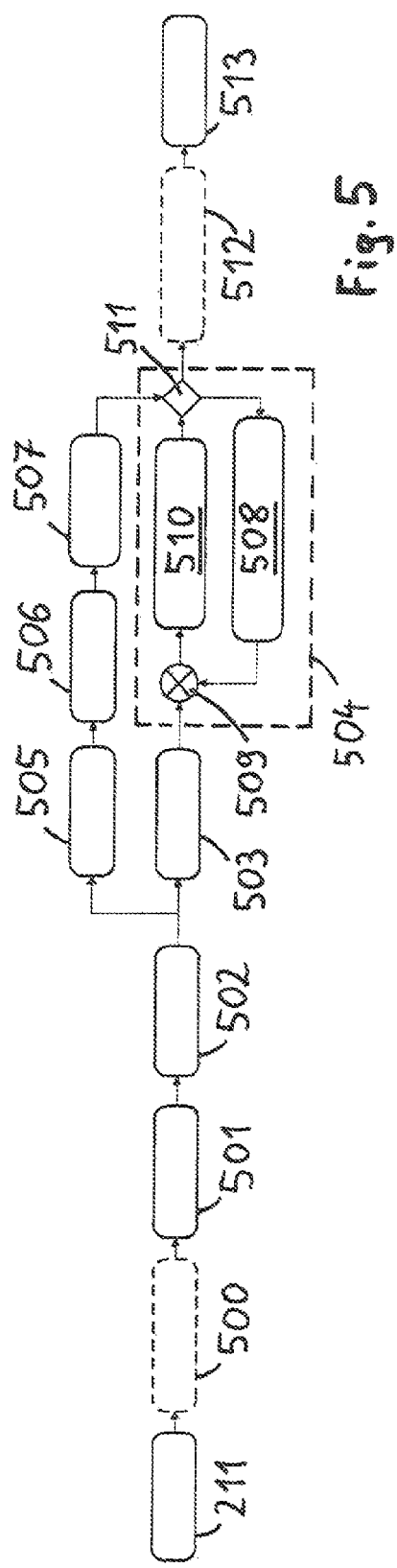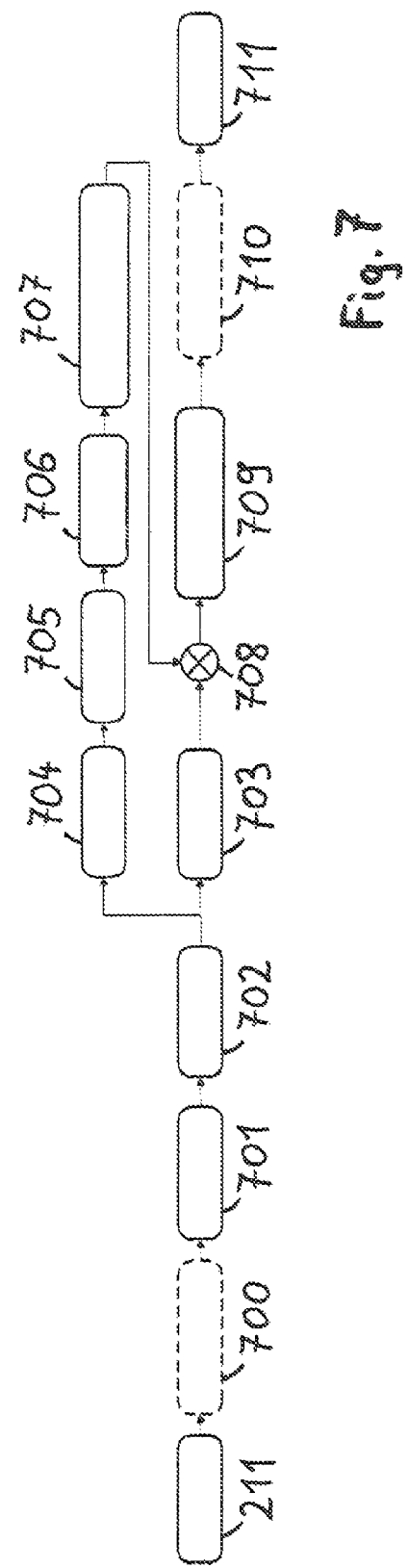

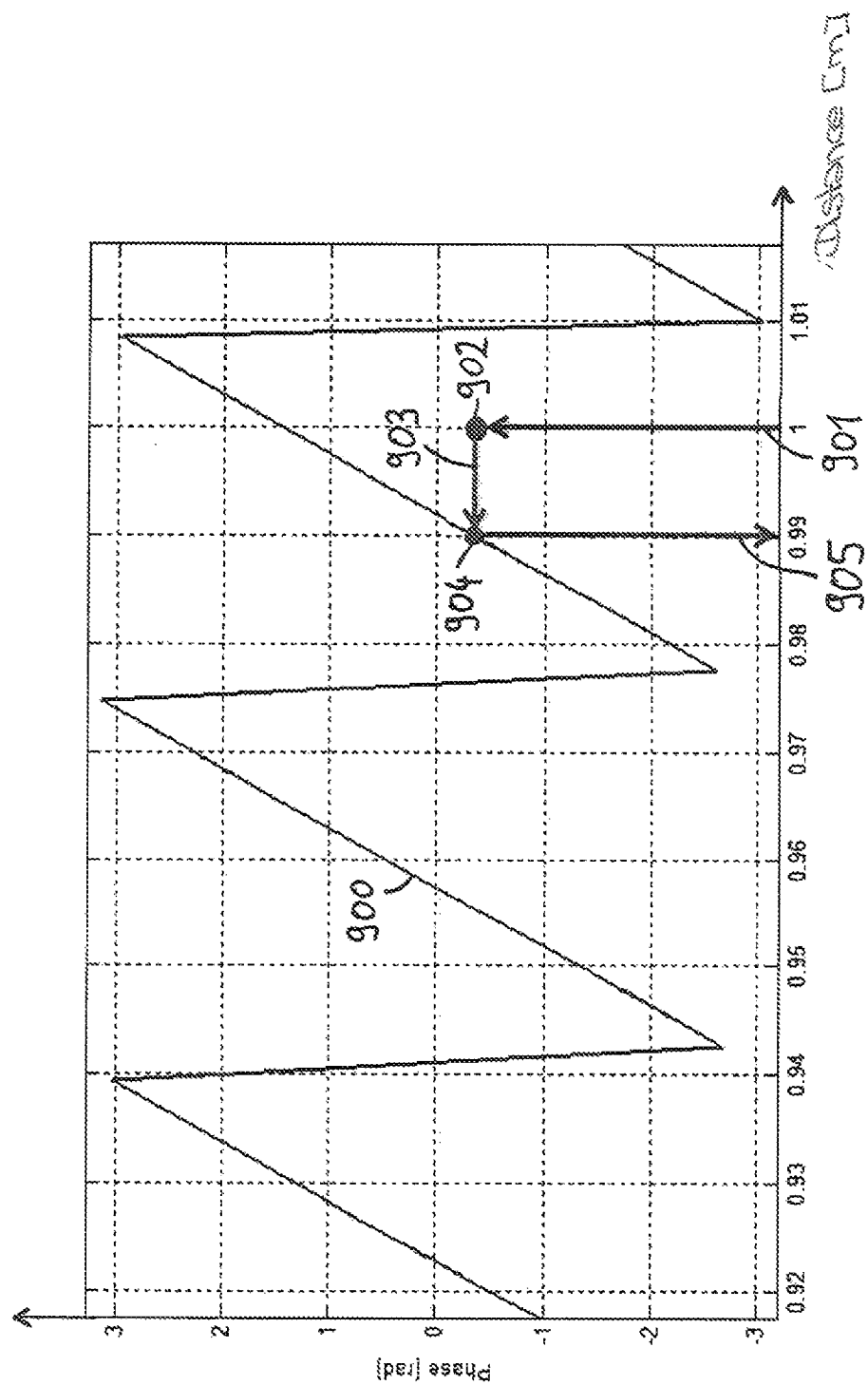

EFFICIENT DISPERSION CORRECTION FOR FMCW-RADAR IN A PIPE

TECHNICAL FIELD

The invention relates to a method for determining a distance to a surface of a medium or to another radar target in a pipe by means of a radar measurement apparatus. Furthermore, the invention relates to a radar measurement apparatus for determining a distance to a surface of a medium or to another radar target in a pipe. The terminology, pipe, as used herein is intended to include the terminology, tube.

BACKGROUND DISCUSSION

In process automation technology, field devices are often applied, which serve for registering and/or influencing process variables. Examples of such field devices are fill level measuring devices, mass flow measuring devices, pressure- and temperature measuring devices, etc., which, as sensors, register the corresponding process variables, fill level, flow, pressure, and temperature.

Referred to, in principle, as field devices are all devices, which are applied near to the process and deliver, or process, process relevant information.

A large number of such field devices are produced and sold by the firm, Endress+Hauser.

With the help of radar measurement apparatuses based on FMCW (Frequency Modulated Continuous Wave) radar, the fill level in a container or tank can be measured exactly. In the case of radar measurement in a pipe, however, special effects occur, because the pipe acts as a hollow conductor for the radar waves. Radar waves propagate differently in hollow conductors.

SUMMARY OF THE INVENTION

An object of the invention is to provide an efficient and exact distance measurement by means of radar in a pipe.

This object is achieved by the features set forth in claims 1 and 16.

This object is achieved by a method corresponding to the forms of embodiment of the invention serves for determining distance to a surface of a medium or to another radar target in a pipe by means of a radar measurement apparatus. The method works according to the principle of FMCW radar and includes steps of transmitting within the pipe a radar transmission signal frequency-modulated according to the FMCW principle, receiving a radar received signal reflected on the surface of the medium or on the other radar target in the pipe back to the radar measurement apparatus, mixing the radar received signal with the radar transmission signal or a signal derived therefrom and producing an intermediate signal, determining a frequency spectrum of the intermediate signal or a signal derived therefrom by means of fast Fourier transformation and detecting the position of the frequency peak in the frequency spectrum. The method includes, moreover, determining a dispersion correction for removing, respectively lessening, dispersion effects, applying the dispersion correction to the intermediate frequency signal or a signal derived therefrom and producing a dispersion corrected signal and determining of the position of the frequency peak in the frequency spectrum of the dispersion corrected signal anew by introducing a number of frequency support points in the region of the previously detected frequency peak, determining the respective frequency amplitudes selectively at the newly introduced frequency support points by means of discrete Fourier transformation or by means of the Goertzel algorithm, ascertaining the position of the frequency peak in the frequency spectrum of the dispersion corrected signal using the frequency amplitudes at the newly introduced frequency support points and deriving the distance to the surface of the medium or to the other radar target in the pipe from the position of the frequency peak in the frequency spectrum.

In this method, the computationally intensive Fourier transformation of the intermediate signal (or a signal derived therefrom) and the following peak detection are performed only a single time in advance. In this way, the rough position of the frequency peak in the frequency spectrum becomes known. Then, the dispersion correction, which lessens, respectively removes, the dispersion effects arising in the pipe, is applied to the intermediate frequency signal (or a signal derived therefrom), and one obtains a dispersion corrected signal.

For determining the exact position of the frequency peak in the frequency spectrum of the dispersion corrected signal, then a number of frequency support points are inserted in the region of the frequency peak. The frequency amplitudes at these frequency support points are determined by means of discrete Fourier transformation or by means of the Goertzel algorithm. In this way, the position of the respective peak maximum of the frequency peak in the frequency spectrum can be ascertained with high accuracy, without it being necessary for this that a renewed computationally intensive Fourier transformation and a renewed peak detection must be performed. It is sufficient to determine the frequency amplitudes at some frequency support points selectively by means of DFT (Discrete Fourier Transformation) or by means of the Goertzel algorithm. From the exact position of the respective peak maximum, then the distance to the surface of the medium or to the other radar target in the pipe can be derived with high accuracy.

Because of the clearly lesser computational effort, the spectral evaluation of the dispersion corrected signal can be performed in much less time than previously, so that an exact measured value of distance becomes quickly available. The method provides distance measurements with an accuracy in the sub-millimeter range.

BRIEF DESCRIPTION OF THE DRAWINGS

The invention will now be explained in greater detail based on a number of examples of embodiments presented in the drawing, the figures of which show as follows:

FIG. 2B illustrates frequency as a function of time for transmitted and received signals;

FIG. 3 illustrates propagation velocity as a function of frequency for a certain mode in a pipe;

FIG. 5 is a flow diagram for performing a dispersion correction, in the case of which the Fourier transformation as well as the peak detection are executed a single time before the iteration loop;

FIG. 7 illustrates a simplified flow diagram for performing a dispersion correction;

FIG. 9 is a schematic representation of making use of phase.

DETAILED DISCUSSION IN CONJUNCTION WITH THE DRAWINGS

Principles of Fill Level Measurement in a Pipe by Means of Radar

Figure 1A:
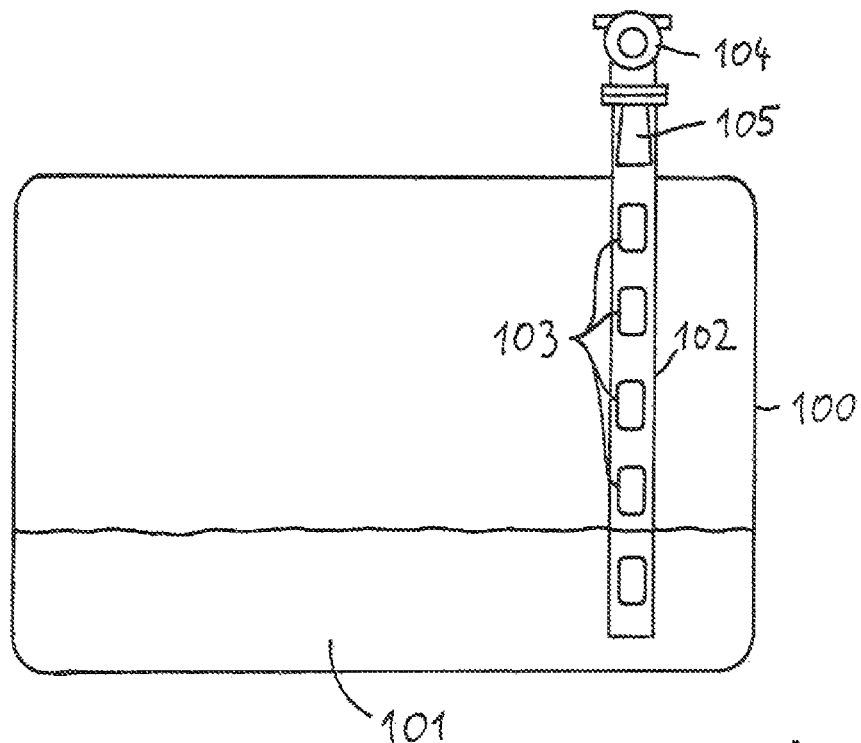
FIG. 1A illustrates a tank with a sounding pipe and a radar measuring device for performing a fill level measurement in the sounding pipe.

FIG. 1A shows a tank 100, which is filled partially with a medium 101. Arranged in the tank 100 is a vertical sounding pipe 102, which protrudes inwardly into the medium 101. The medium 101 can be a liquid, for example, but it can also be a flowable bulk good. Sounding pipe 102 is open on its lower end. Moreover, the wall of the sounding pipe 102 includes a number of perforations 103, so that the fill level of the medium 101 in the interior of the sounding pipe 102 corresponds to the fill level of the medium 101 outside of the sounding pipe 102. Sounding pipe 102 is provided, on the one hand, to quiet movements of the medium 101 in the tank 100. Sounding pipe 102 serves, thus, as a "wave breaker". Moreover, the sounding pipe 102 can be applied for determining the fill level of the medium 101. Earlier, mechanical method were applied for this, while, today, fill level measurement is performed within the sounding pipe 102 by means of radar. For this, a radar measuring device 104 is placed on the upper end of the sounding pipe 102. Radar measuring device 104 includes a radar transmission unit, which produces a radar transmission signal and couples such via the waveguide transition 105 into the sounding pipe 102. The transmitted radar signal is reflected on the surface of the medium 101 within the sounding pipe 102 and returns to the radar measuring device 104. Radar measuring device 104 includes a radar receiving unit, which receives and evaluates the returned radar signal. Based on the received signal, the fill level of the medium 101 can then be determined.

Use of the sounding pipe 102 offers a series of advantages for the fill level measurement in the tank 100. Thus, the wall of the sounding pipe 102 assures that, even in the case of an agitated surface of the medium 101, the surface within the sounding pipe 102 remains comparatively quiet. Also, when foam is formed within the tank, the foam in general will not influence the measuring in the sounding pipe 102. In case a fill level measurement should be performed within a comparatively small containment, there is within the containment often insufficient space for a radar measuring device. For a sounding pipe with comparatively small diameter, in contrast, sufficient space is present. The radar measuring device can then be placed outside of the containment. A further advantage is that the radar waves are concentrated by the sounding pipe 102 to a comparatively small area. In this way, one obtains a stronger reflection signal. This is especially advantageous, when the medium 101 is a liquid with a low dielectric constant, which has comparatively poor reflection characteristics. In the case of application of a sounding pipe, one obtains even for such liquids a reflected signal of sufficient intensity. The application of a sounding pipe also offers advantages when the medium is poisonous or a dangerous chemical. Sounding pipe 102 enables the installation of an additional ball valve, which sealedly closes the tank 100, when one must remove the measuring device 104. In this case, it is not necessary to empty the tank 100 before removing the radar measuring device 104.

Preferably for determining fill level a radar measurement using the FMCW (Frequency Modulated Continuous Wave) principle is performed.

Figure 1B:
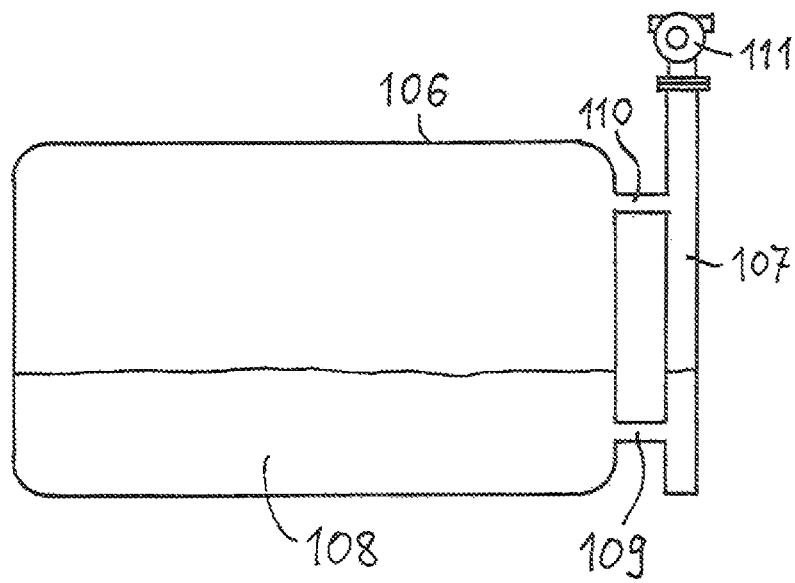
FIG. 1B illustrates a tank with a detour pipe arranged outside of the tank and with a radar measuring device for performing a fill level measurement in the detour pipe.

FIG. 1B shows a further example of an embodiment, in the case of which the fill level in a tank 106 is determined by means of a detour pipe 107 mounted outside of the tank 106. Tank 106 is partially filled with a medium 108, for example, a liquid or a flowable bulk good. Detour pipe 107 involves a vertical pipe arranged outside of the tank 106. The vertical pipe is connected with the tank 106 via a lower connecting pipe 109 and an upper connecting pipe 110. Therefore, the detour pipe 107 is partially filled with the medium 108, wherein the fill level of the medium 108 within the detour pipe 107 corresponds to the fill level of the medium 108 in the tank 106. Performed within the detour pipe 107 is a fill level measurement by means of radar. For this, a radar measuring device 111 is placed on the upper end of the detour pipe 107. The radar measuring device 111 includes a radar transmission unit, which produces a radar transmission signal and couples such into the detour pipe 107. The radar transmission signal reaches the surface of the medium 108 within the detour pipe 107 and is reflected on the surface of the medium 108 back to the radar measuring device 111. Radar measuring device 111 includes a radar receiving unit, which receives and evaluates the radar signal reflected on the surface of the medium 108. Based on the radar received signal, then the fill level of the medium 108 in the detour pipe 107 can be determined and, thus, also the fill level of the medium 108 in the tank 106.

Preferably for determining the fill level, a radar measurement is performed corresponding to the FMCW (Frequency Modulated Continuous Wave) principle.

Distance Measurement by Means of Radar According to the FMCW Principle

In the case of distance measurement by means of radar according to the FMCW (Frequency Modulated Continuous Wave) principle, a frequency modulated radar signal is transmitted in continuous wave operation and reflected on the respective target. The reflected signal is received and evaluated by the distance sensor.

Figure 2A:
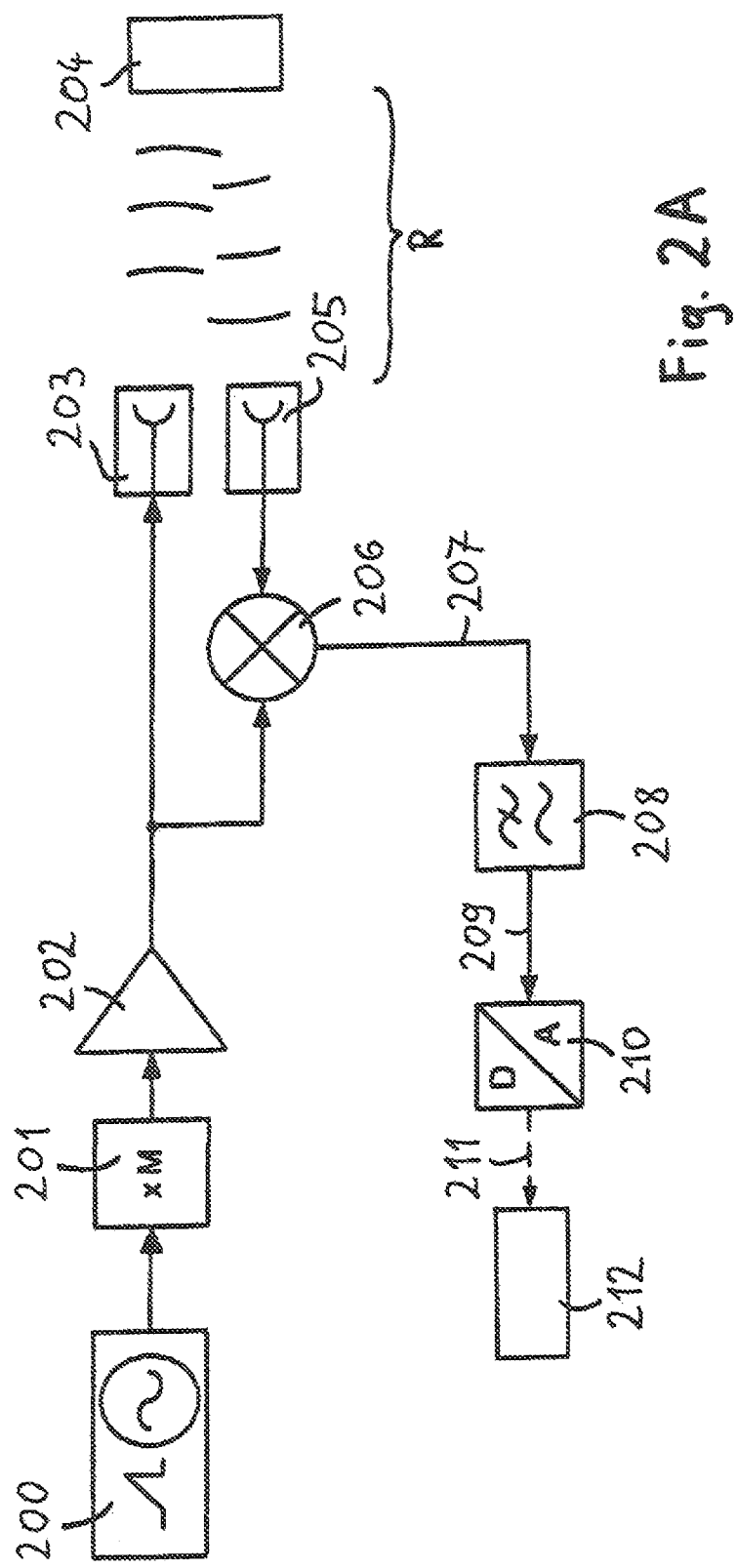
FIG. 2A a block diagram of a distance sensor according to the FMCW principle.

FIG. 2A shows a block diagram of a distance sensor, which works according to the FMCW principle. The transmitting branch of the distance sensor includes a signal generator 200, which produces a frequency modulated signal. The signal produced by the signal generator 200 moves through a frequency multiplying stage 201, in which the frequency of the signal is multiplied by a predetermined factor, to an amplifier 202. There, the signal is amplified and then fed to a transmitting port 203. The frequency modulated radar transmission signal is issued via the transmitting port 203.

FIG. 2B shows the frequency of the produced transmission signal 213 as a function of time. Visible is that the frequency of the transmission signal 213 alternately linearly rises and falls, so that, as a whole, a triangular curve results. During a first modulation period length $T_0$, the frequency of the transmission signal increases linearly from the frequency $f_0$ to the frequency $f_0+\Delta f_0$, wherein the variable $\Delta f_0$ is referred to as the frequency sweep. subsequently, the frequency $f_0+\Delta f_0$ falls back to $f_0$. Alternatively to the triangular curve, the frequency of the transmission signal can also have a sawtooth-shaped frequency curve.

The frequency $f_s(t)$ of the sent transmission signal 213 rises as a function of time with the slope S:

$$f_s(t)=f_0+S\cdot t \quad (1)$$

The slope S is fixed by the frequency sweep $\Delta f_0$ and the modulation period length $T_0$:

$$S = \frac{\Delta f_0}{T_0} \quad (2)$$

The frequencies of radar transmission signals lie, for example, in the range of, for instance, 4 GHz to 100 GHz. The frequency sweep $\Delta f_0$ could be, for example, several GHz. The modulation period length could be selected, for example, from the range between, for instance, 0.1 msec and 5 msec. This data serves only to illustrate typical orders of magnitude. Solutions outside of these ranges are possible.

As shown in FIG. 2A, a part of the radiated transmission signal is reflected back to the distance sensor by a target 204 located a distance R from the distance sensor. The radar signal requires a travel time $\tau$ for the path from the transmitting port 203 to the target 204 and back to the receiving port 205.

The reflected signal is received by the receiving port 205 of the distance sensor and fed to a receiving mixer 206. In the receiving mixer 206, the received signal is mixed with the momentarily transmitted transmission signal. The so produced mixer signal 207 is filtered by a sampling, lowpass filter 208, which suppresses frequency components above a limit frequency. The sampling, lowpass filter 208 limits the bandwidth of the mixer signal 207 before the digitizing. Moreover, the limit frequency establishes a maximum distance $R_{max}$. The lowpass filtered, intermediate frequency signal 209 is sampled and digitized by an analog-digital converter 210. The so obtained, digitized, intermediate frequency signal 211 contains target frequency components for one or more targets, from which, in each case, the associated target distances can be determined. The digitized, intermediate frequency signal 211 is fed to the digital signal processing unit 212 for evaluation, which determines the frequency components contained in the intermediate frequency signal. The distances can then be directly determined from the frequency peaks of the frequency spectrum.

Distance sensors of the type shown in FIG. 2A can be applied, for example, as fill level measuring devices in process measurements technology, in order to determine the distance to a surface of a liquid or a bulk good in a container.

Signal Propagation in the Free Field Case

When the transmission signal 213 is freely radiated (the so called "free field case"), then the signal propagates with the speed of light c. A part of the radiated transmission signal is reflected back to the distance sensor by the target 204.

For the free field case, the travel time $\tau$, which the signal requires for the distance from the transmitting unit to the target 204 and back to the receiving unit, can be expressed as follows:

$$\tau = \frac{2\cdot R}{c} \quad (3)$$

In such case, R is the target distance and c the speed of light in air. The speed of light in air c is related to the speed of light co in vacuum according to the relationship $$c = \frac{c_0}{\sqrt{\varepsilon_r}},$$

wherein $\varepsilon_r$ is the dielectric constant of air.

During the travel time $\tau$ required by the radar signal, the transmission signal 213 produced by the signal generator continues to rise, so that the frequency of the momentarily radiated transmission signal is higher than the frequency of the received signal. The received signal 214 delayed by the travel time $\tau$ is shown dashed in FIG. 2B for the free field case.

As a result of the travel time $\tau$ of the radar signal, there is a frequency difference between transmitted and received signals characteristic for the travel time $\tau$. This frequency difference is referred to as the target frequency $f_{target}$. For the free field case, the target frequency $f_{target}$ can be derived from the slope S of the transmission signal of and the travel time $\tau$. The resulting equation for the target frequency $f_{target}$ is:

$$f_{target} = S\cdot \tau = S\cdot \frac{2\cdot R}{c} \quad (4)$$

Since the variables S and c are constant, there is in the free field case a direct proportionality between the target frequency $f_{target}$ and the associated distance R to the target. Consequently, the distance R to the target can be derived directly from the target frequency $f_{target}$.

Signal Propagation in a Pipe

The propagation of the radar signal in a pipe differs significantly from the propagation of the radar signal in the free field, because the wall of the pipe bounds and guides the wave propagation. For the radar signal, the pipe acts as a round, hollow conductor.

Taking into consideration the features of a round hollow conductor, the differential equation for wave propagation therein can be derived from Maxwell's equations. The solution of such differential equation are the Bessel functions, which describe the propagation of the radar signal in the round hollow conductor.

In such case, different modes result for the signal propagation in the round hollow conductor. Referred to as modes are certain electrical and magnetic field configurations, which can propagate in the hollow conductor. Fundamentally, there are two different types of modes in the hollow conductor: The $TE_{m,n}$ modes (transverse electric) and the $TM_{m,n}$ modes (transverse magnetic). In the case of the $TE_{m,n}$ modes, the electrical field vector is oriented perpendicular to the propagation direction of the wave. In the case of the $TM_{m,n}$ modes, the magnetic field vector is oriented perpendicular to the propagation direction of the wave.

Characteristic for the propagation of electromagnetic waves in hollow conductors is that the electromagnetic wave can propagate in the hollow conductor only when its frequency lies above a defined cutoff frequency $f_c$. For electromagnetic waves with a frequency below this characteristic cutoff frequency $f_c$, no wave propagation is possible in the hollow conductor. The cutoff frequency $f_c$ is different for each mode and can be calculated for each mode individually.

For a TE-mode $TE_{m,n}$, the associated cutoff frequency $f_{c,mn}$ results as follows:

$$f_{c,mn} = \frac{c \cdot \chi'_{mn}}{\pi \cdot D} \qquad (5)$$

In this equation, $\chi'_{mn}$ is the n-th root of the derivative of the m-th Bessel function $J_m(X)$, c is the speed of light in air, and D the diameter of the round hollow conductor (thus of the pipe).

For a TM-mode $TM_{m,n}$, the associated cutoff frequency $f_{c,mn}$ results as follows:

$$f_{c,mn} = \frac{c \cdot \chi_{mn}}{\pi \cdot D} \qquad (6)$$

In this equation, $\chi_{mn}$ is the n-th root of the m-th Bessel-function $J_m(X)$, c is the speed of light in air, and D the diameter of the round hollow conductor (thus of the pipe).

In the free field case, radar waves propagate with the speed of light c in air. In the free field case, the propagation velocity thus does not depend on the frequency of the radar signal.

The individual modes propagate in the hollow conductor, in each case, with a group velocity $v_g$, which depends on the speed of light c in air and the factor $\beta_{rel,mn}$ as follows:

$$v_g = c \cdot \beta_{rel,mn} \qquad (7)$$

The factor $\beta_{rel,mn}$ has the following form:

$$\beta_{rel,mn} = \sqrt{1 - \left(\frac{f_{c,mn}}{f}\right)^2} \qquad (8)$$

In such case, $f_{c,mn}$ is the cutoff frequency of the respective mode and f is the frequency of the radar signal. The factor $\beta_{rel,mn}$ has values in the range between 0 and 1.

Taking this into consideration, the group velocity $v_g$ of a mode in the hollow conductor can thus be expressed as follows:

$$v_g = c \cdot \sqrt{1 - \left(\frac{f_{c,mn}}{f}\right)^2} \qquad (9)$$

The antenna structure for in-coupling the radar signal into the pipe is preferably so designed that the energy is applied essentially for exciting only a single mode. Since each mode has a different propagation behavior, one would like to prevent the forming of multiple modes in the case of radar measurement in pipes. False or blurred echos, which result from different travel times of different, mutually superimposed modes, would otherwise follow. Especially advantageous is the exciting of the mode $TE_{01}$, because the field configuration of this mode is especially well suited for propagation in the pipe.

In the following, discussion will be limited to the case, in which essentially only a single mode is excited.

For illustrating the propagation behavior of radar signals in the hollow conductor, the group velocity $v_g$ in the hollow conductor is plotted in FIG. 3 as a function of frequency. FIG. 3 shows the cutoff frequency $f_{c,mn}$ for a certain mode. For frequencies below this cutoff frequency, no wave propagation is possible in the hollow conductor. Wave propagation in the hollow conductor begins at the cutoff frequency $f_{c,mn}$. With rising frequency, the group velocity $v_g$ in the hollow conductor increases and approaches the speed of light c in air asymptotically.

Visible in FIG. 3 is that the group velocity $v_g$ in the hollow conductor, thus the propagation velocity of the radar signal in the hollow conductor, has a strong dependence on the frequency of the radar signal. Radar signal components of different frequency propagate in the hollow conductor with different velocity.

In the case of fill level measurement in a pipe, a radar signal frequency modulated according to the principles of FMCW radar is coupled into the pipe. Since the frequency of the coupled FMCW radar signal varies corresponding to the ramp shown in FIG. 2B, also the propagation velocity of the radar signal varies. Caused by the different propagation velocities is a blurring and diverging of the reflected radar signal, which must be evaluated by the radar measuring device. This frequency dependence of the propagation velocity is referred to as dispersion. The effects caused by the frequency dependent propagation velocity, especially the blurring and diverging of the reflected signal, are referred to as dispersive effects. In the following, a correction for these dispersive effects will be derived.

Effects Caused by Dispersion in the Phase-Time Curve of the Intermediate Signal

The transmission signal of a FMCW radar in the form a frequency ramp can be described by its instantaneously sent frequency $f_s(t)$ in accordance with equation (1):

$$f_s(t) = f_0 + S \cdot t \quad (1)$$

In such case, $f_0$ is the starting frequency and S the slope of the frequency ramp. The frequency rises linearly beginning at the starting frequency $f_0$ with the slope S. The slope S is established according to equation (2) by the frequency sweep $\Delta f_0$ and the modulation period length $T_0$:

$$S = \frac{\Delta f_0}{T_0} \qquad (2)$$

In general, the transmission signal can be expressed as a function of its instantaneous phase $\phi_s(t)$:

$$s(t) = \cos(\phi_s(t)) \qquad (10)$$

The instantaneous phase $\phi_s(t)$ can be calculated by integration of the instantaneous frequency $f_s(t)$:

$$\phi_s(t) = 2\pi \int_0^t f_s(\bar{t}) d\bar{t} = 2\pi f_0 t + \pi S t^2 + \phi_{s,0} \quad (11)$$

The transmission signal travels within the pipe to a radar target. The radar target can be e.g. the surface of the liquid or the bulk good. The transmission signal is reflected on the radar target at the distance R and travels back to the radar measuring device. In this way, there results a frequency dependent delay time $\tau(f)$, which due to the linearly increasing ramp behavior can also be written in simple manner as a function of time t:

$$\tau(t) = \frac{2 \cdot R}{c \cdot \beta_{rel}(f)} \qquad (12)$$

-continued $$= \frac{2 \cdot R}{c \cdot \sqrt{1 - \left(\frac{f_{c,mn}}{f_s(t)}\right)^2}}$$

$$= \frac{2 \cdot R}{c \cdot \sqrt{1 - \left(\frac{f_{c,mn}}{f_0 + S \cdot t}\right)^2}}$$

Correspondingly for the received signal e(t):

$$e(t) = \cos(\varphi_e(t)) \qquad (13)$$

$$\varphi_e(t) = 2\pi \int_0^t f_s(\bar{t} - \tau(\bar{t}))d\bar{t} \qquad (14)$$

$$= 2\pi \int_0^t f_0 + S \cdot (\bar{t} - \tau(\bar{t}))d\bar{t}$$

$$= 2\pi \int_0^t f_0 + S \cdot \bar{t} - S\tau(\bar{t})d\bar{t}$$

$$= 2\pi f_0 t + \pi S t^2 - 2\pi S \cdot \int_0^t \tau(\bar{t})d\bar{t} + \varphi_{e,0}$$

The intermediate signal is produced in the receiving mixer 206 shown in FIG. 2A by mixing the transmission signal with the received signal. The filtered intermediate frequency signal reflects (assuming an ideal mixer) the phase difference between the phase $\phi_s(t)$ of the transmission signal and the phase $\phi_e(t)$ of the received signal. The mixing of transmission signal and received signal leads thus to an intermediate frequency signal representable as follows:

$$z(t) = \cos(\varphi_z(t)) \qquad (15)$$

$$\varphi_z(t) = \varphi_s(t) - \varphi_e(t) \qquad (16)$$

$$= 2\pi S \cdot \int_0^t \tau(\bar{t})d\bar{t} + \Delta\varphi$$

$$= 2\pi \frac{2SR}{c} \cdot \int_0^t \frac{1}{\beta_{rel}(f_0 + S \cdot \bar{t})}d\bar{t} + \Delta\varphi$$

$$= 2\pi \frac{2R}{c} \frac{(f_0 + f_c + St)(f_0 - f_c + St)}{(f_0 + St)\sqrt{\frac{f_0^2 + 2f_0 St + S^2 t^2 - f_c^2}{(f_0 + St)^2}}}\Bigg|_{\bar{t}=0}^{t} + \Delta\varphi$$

$$= 2\pi \frac{2R}{c} \cdot \sqrt{(f_0 + St)^2 - f_c^2}\Bigg|_{\bar{t}=0}^{t} + \Delta\varphi$$

$$= 2\pi \frac{2R}{c} \cdot \left(\sqrt{(f_0 + St)^2 - f_c^2} - \sqrt{f_0^2 - f_c^2}\right) + \Delta\varphi$$

This equation captures the dispersive effects in the phase-time curve of the intermediate signal caused by the frequency dependence of the group velocity. In such case, all time independent phase contributions are combined in the starting phase $\Delta\phi$.

Determining the Starting Phase $\Delta\phi$

All time independent phase contributions to the phase $\phi_z(t)$ of the intermediate signal are combined in the starting phase $\Delta\phi$. The determining of this starting phase $\Delta\phi$ will now be explained. The starting phase $\Delta\phi$ can be estimated by the difference between the phase $\phi_s(t)$ of the sent transmission signal and the phase $\phi_e(t)$ of the received signal at the point in time t=0.

The phase $\phi_s(t)$ of the sent transmission signal can be written as equation (11):

$$\phi_s(t) = 2\pi \int_0^t f_s(\bar{t})d\bar{t} = 2\pi f_0 t + \pi S t^2 + \phi_{s,0} \qquad (11)$$

For the phase $\phi_e(t)$ of the received signal for determining the starting phase $\Delta\phi$, an estimation is performed. For determining the starting phase $\Delta\phi$, it is assumed that the travel time $\tau$ is constant and does not depend on frequency. For determining the starting phase $\Delta\phi$, thus as in the free field case, dispersion is neglected. This approach is quite wrong for a pipe, because in a pipe the propagation velocity and therewith also the travel time $\tau$ depend on the frequency of the radar signal. Nevertheless, the following expression, in the case of which a constant, frequency independent, travel time $\tau$ is used, can be applied for estimating the starting phase $\Delta\phi$ of the intermediate frequency:

$$\varphi_e(t) = \varphi_s(t - \tau) \qquad (17)$$

$$= 2\pi f_0(t - \tau) + \pi S(t - \tau)^2 + \varphi_{s,0}$$

$$= 2\pi f_0 t - 2\pi f_0 \tau + \pi S t^2 + \pi S \tau^2 - 2\pi S t\tau + \varphi_{s,0}$$

For the starting phase $\Delta\phi$ there results then:

$$\Delta\varphi = \varphi_s(0) - \varphi_e(0) = \qquad (18)$$

$$= 2\pi f_0 \tau(0) + \pi S \tau^2(0)$$

Correspondingly, equation (12) yields for $\tau(0)$:

$$\tau(0) = \frac{2 \cdot R}{c \cdot \beta_{rel}(f_0)} \qquad (19)$$

Therewith, there results the starting phase $\phi_z(0)$:

$$\varphi_z(0) = \Delta\varphi = 2\pi f_0 \frac{2R}{c \cdot \beta_{rel}(f_0)} + \pi S \left(\frac{2R}{c \cdot \beta_{rel}(f_0)}\right)^2 \mod 2\pi \qquad (20)$$

Deriving a Dispersion Correction

The intermediate frequency signal z(t) after a Fourier transformation is interpretable as a distance response of the radar system. The non-linear phase-time curve leads in the case of the Fourier transformation to a blurring of the target response in the spectral range.

In the following, options will be discussed for evaluating the intermediate signal under the influence of dispersion as well as giving attention to other sources of error.

Corresponding to the forms of embodiment of the invention, a correction of the dispersion influence on the phase performed is before further evaluation. The dispersion correction counteracts a broadening and blurring of the peak in the spectral range.

In the following, the phase correction for the phase of the intermediate signal is derived before further evaluation. This dispersion correction has, on the one hand, the goal of lessening, respectively eliminating, the phase behavior corresponding to equation (16) caused by the dispersion. Moreover, a phase rising linearly with time is added, such as would occur in the case of a system with constant, frequency independent, group velocity $v_{const}$. In such case, the diameter D of the hollow conductor, respectively the cutoff frequency $f_c$ resulting therefrom, is taken into consideration. The cutoff frequency derived from the measured diameter D and burdened with measurement uncertainty is referred to in the following as $\hat{f}_c$. In this case, there results following phase correction:

$$\varphi_{z,corr}(t) = 2\pi \frac{2R}{c} \cdot \left( \sqrt{(f_0 + St)^2 - \hat{f}_c^2} - \sqrt{f_0^2 - \hat{f}_c^2} \right) - 2\pi \frac{2RS}{v_{const}} \cdot t \quad (21)$$

The first term $$2\pi \frac{2R}{c} \cdot \left( \sqrt{(f_0 + St)^2 - \hat{f}_c^2} - \sqrt{f_0^2 - \hat{f}_c^2} \right) \quad (22)$$

serves for lessening, respectively eliminating, the phase behavior caused by dispersion.

The second term $$-2\pi \frac{2RS}{v_{const}} \cdot t \quad (23)$$

serves for joining a time linearly increasing phase, which would result in the case of constant, frequency independent, group velocity $v_{const}$. The constant, frequency independent, propagation velocity $v_{const}$ can be freely fixed within certain limits. For example, $v_{const}$ can be fixed as the group velocity at the frequency $f_0$: $v_{const} = c \cdot \beta_{rel}(f_0)$ or $v_{const}$ can be fixed as the speed of light c in air: $v_{const} = c$.

Especially advantageous is to define the constant, frequency independent, propagation velocity $v_{const}$ as the group velocity at the center frequency $f_{center}$ of the frequency ramp shown in FIG. 2B. The constant propagation velocity $v_{const}$ is thus fixed as the propagation velocity at the frequency $f_{center}$ $$v_{const} = c \cdot \beta_{rel}(f_{center}) \quad (24)$$

wherein the center frequency $f_{center}$ of the frequency ramp can be expressed as:

$$f_{center} = f_0 + S \cdot \frac{T_0}{2}. \quad (25)$$

Dependence of the Dispersion Correction on the Distance R to the Target

In equation (21), both the first term as well as also the second term of the phase correction $\varphi_{z,corr}(t)$ depend on the distance R to the target, but at the point in time of determining the phase correction, R still is not known. The distance R to the target needs to be determined first.

In order to be able to perform the phase correction $\varphi_{z,corr}(t)$ described by equation (21) in spite of this, there are different options:

A first option is to estimate the distance R to the target by evaluating the non-dispersion corrected, intermediate signal delivered by the receiving mixer 206. The so obtained distance to target is, indeed, not exact, but it can be taken into consideration for an initial determination of the phase correction $\varphi_{z,corr}(t)$.

A second option for estimating the distance to target is possible when the fill level of a containment is determined cyclically at regular time intervals. In this case, one can proceed on the assumption that the fill level changes slowly and continuously. Therefore, two sequentially ascertained measured values of fill level lie relatively near to one another. In that case, a preceding measured value of fill level can serve as an estimation for the current measured value of fill level. Based on this assumption, an earlier measured value of fill level can be used as estimated value for the distance to the target.

Iterative Determining of the Distance R to the Target and the Phase Correction $\varphi_{z,corr}(T)$ in Reciprocal Dependence A still higher accuracy can be achieved by use of an iterative method. In such case, again, an estimated value of the distance to target serves as starting point for a determining of the dispersion correction $\varphi_{z,corr}(t)$. The dispersion correction $\varphi_{z,corr}(t)$ is taken into consideration for correction of the intermediate signal, and, starting from the dispersion corrected, intermediate frequency signal, an improved, more accurate value of the distance R to the target can be ascertained. With help of this more exact value of R, the dispersion correction is determined anew and taken into consideration for correction of the intermediate signal. The so obtained, dispersion corrected, intermediate frequency signal can then, in turn, serve for determining the target distance R with yet better accuracy, etc. Thus, the distance R to the target and the dispersion correction $\varphi_{z,corr}(t)$ can be determined iteratively in reciprocal dependence. Over the course of a number of iterations, the distance R to the target converges to its actual value and also the dispersion correction $\varphi_{z,corr}(t)$ becomes always more exact, so that dispersive effects are always better eliminated. By this iterative procedure, one obtains already after a few iterations very exact values for the distance R to the target and the dispersion correction $\varphi_{z,corr}(t)$.

Evaluation of the Phase Corrected, Intermediate Signal

If one subtracts the dispersion correction $\varphi_{z,corr}(t)$ from the measured phase, then there remains ideally (in the case of faultlessly known pipe diameter) a phase-time curve rising linearly with time, resulting from the second term of equation (21):

$$\varphi_c(t) = \varphi_z(t) - \varphi_{z,corr}(t) \quad (26)$$
$$= 2\pi \frac{2RS}{v_{const}} \cdot t$$

One obtains therefrom the target frequency component $f_{target}$:

$$f_{target} = \frac{\omega}{2\Pi} = \frac{1}{2\Pi} \frac{d}{dt} \varphi_c(t) = \frac{2RS}{v_{const}} \quad (27)$$

From the so ascertained, target frequency component, then the distance R to the target can be derived:

$$R = \frac{f_{target} \cdot v_{const}}{2S} \quad (28)$$

For evaluation, again exactly that propagation velocity $v_{const}$ is used, which was already used in equation (21) for producing the linearly increasing, second term for the phase.

When thus $v_{const}=c\cdot\beta_{rel}(f_{center})$ was used there, then also for evaluation again $v_{const}=c\cdot\beta_{rel}(f_{center})$ is used.

No Change of the Starting Phase $\phi_z(0)$ by the Phase Correction

Equation (21) shows that at t=0 the starting phase $\phi_z(0)$ is not changed by the phase correction. This starting phase can thus likewise be read out from the result of the complex Fourier transformation at the position of the magnitude maximum in the spectral range (modulo $2\pi$). For the phase $\phi_z(0)$ it holds, consequently, further corresponding to equation (20) that:

$$\varphi_z(0) = 2\pi f_0 \frac{2R}{c\cdot\beta_{rel}(f_0)} + \pi S\left(\frac{2R}{c\cdot\beta_{rel}(f_0)}\right)^2 \mod 2\pi \quad (20)$$

Application of the dispersion correction does not degrade the phase information of the intermediate signal. Also, after applying the dispersion correction to the phase, the phase information can still be utilized in the context of additional signal evaluation. Thus, after performing the phase correction, both the magnitude as well as also the phase of the intermediate signal can be used for further evaluation. In such case, it is to be noted that the phase reacts clearly less sensitively to small disturbances, as compared with a pure evaluation of the magnitude spectrum, which already shows mentionable deviations in the exact position determination of the maximum.

Advantageous Choice of the Propagation Velocity at the Center Frequency of the Frequency Ramp In the dispersion correction of equation (21), the second term serves for joining a time linearly increasing phase, which would result in the case of constant, frequency independent, group velocity $v_{const}$. The constant, frequency independent, propagation velocity $v_{const}$ can be fixed freely within certain limits. It has already been noted above that it is especially advantageous to define the constant, frequency independent, propagation velocity $v_{const}$ as the group velocity at the center frequency $f_{center}$ of the frequency ramp shown in FIG. 2B. The constant propagation velocity $v_{const}$ is thus fixed as the propagation velocity at the frequency $f_{center}$ $$v_{const}=c\cdot\beta_{rel}(f_{center}) \quad (24)$$

wherein the center frequency $f_{center}$ of the frequency ramp is:

$$f_{center} = f_0 + S\cdot\frac{T_0}{2} \quad (25)$$

Applied to the time signal is the dispersion correction according to equation (21), wherein selected as constant propagation velocity $v_{const}$ is the propagation velocity at the center frequency $f_{center}$ of the frequency ramp. This choice of $v_{const}=c\cdot\beta_{rel}(f_{center})$ has especially the advantage that the position of the frequency peak in the frequency spectrum is influenced only insignificantly by the dispersion correction. The frequency peak, which corresponds to the radar target, remains after the dispersion correction nearly at the same position as before the dispersion correction. Applying the constant propagation velocity $v_{const}=c\cdot\beta_{rel}(f_{center})$ shifts the position of the frequency spectrum as regards the frequency axis only insignificantly, a feature which clearly simplifies further evaluation.

Figure 4:
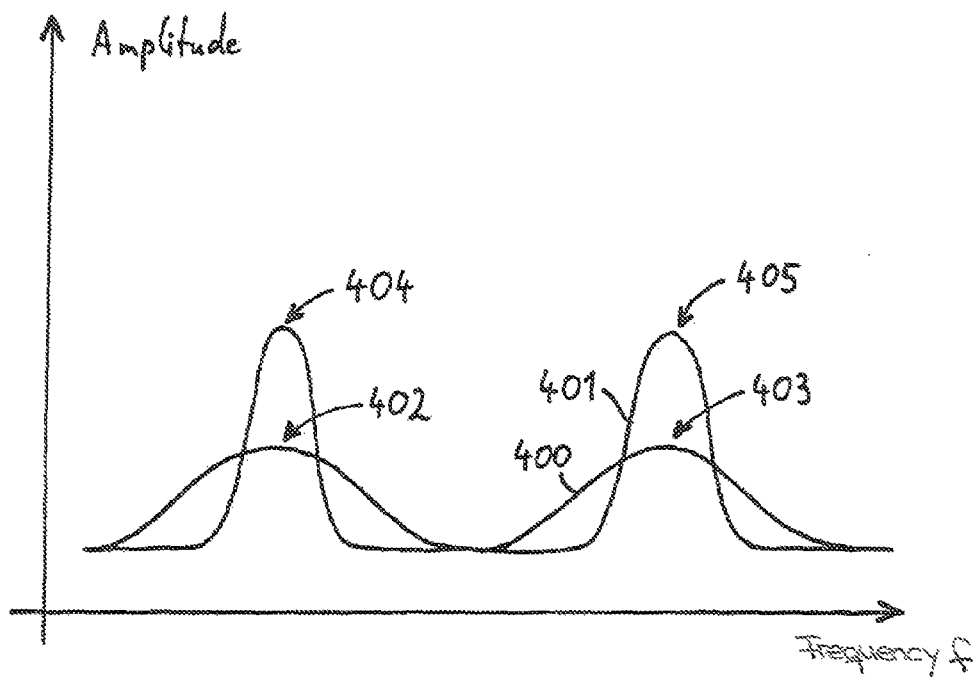
FIG. 4 illustrates the effect of a dispersion correction, which leaves the position of the frequency peak largely unchanged in the frequency spectrum.

FIG. 4 shows, schematically, how the original frequency spectrum is changed by the applying the dispersion correction, when the propagation velocity in the case of the center frequency $f_{center}$ of the frequency ramp is used as constant propagation velocity $v_{const}$. Shown in comparison in FIG. 4 are the original frequency spectrum 400 before the dispersion correction and the corrected frequency spectrum 401 after applying the dispersion correction. Plotted on the horizontal axis is frequency and on the vertical axis the amplitudes of the frequencies. In the original frequency spectrum 400, the peaks 402, 403 are broadened and blurred as a result of the dispersion. By applying the dispersion correction, the widened original peaks 402, 403 are transformed into the corrected peaks 404, 405. The corrected peaks 404, 405 are clearly better defined and, moreover, also clearly narrower than the original peak 402, 403 widened by dispersion. Visible from FIG. 4 is that the corrected peaks 404, 405 are located at the same positions in the frequency spectrum as the original peaks 402, 403. This is a result of the fact that the propagation velocity at the center frequency $f_{center}$ of the frequency ramp is used in the dispersion correction of equation (21) as propagation velocity $v_{const}$. This choice of $v_{const}$ has the result that the positions of the frequency peaks in the frequency spectrum are changed only slightly by the dispersion correction. This has, moreover, the advantage that one manages in the case of the iterative performance of the dispersion correction with a smaller number of iterations than previously, in order to determine the final target frequency and the associated distance to target.

Flow Diagram of the Dispersion Correction

The flow diagram of FIG. 5 shows how the intermediate frequency signal 211 of FIG. 2A can be evaluated by iterative application of a dispersion correction, in order to determine the target frequency components and the target distances with high accuracy. The evaluation flow diagram shown in FIG. 5 makes use of the fact that a dispersion correction with $v_{const}=c\cdot\beta_{rel}(f_{center})$ only slightly influences the position of the peak in the frequency spectrum. For this reason; the position of the peak in the frequency spectrum can be ascertained in an earlier performed, fast Fourier transformation with subsequent peak detection.

Serving as starting point is the digitized, intermediate frequency signal 211 shown in FIG. 2A. The digitized, intermediate frequency signal 211 is a real time signal. In the optional step 500, a so-called "ensemble averaging" is performed. When in a measuring not only one, but, instead, a number of frequency ramps are executed, then the corresponding values of a plurality of sample series can be averaged. This happens in the ensemble averaging in step 500. The ensemble averaging serves to improve the signal-to-noise ratio of the digital, time-domain signal.

In the step 501 following thereon, the dc portion of the time-domain signal is removed. Step 501 is, consequently, also referred to as "DC remove". For this, first of all, the average value of the time sample values is determined, and this average value is then subtracted from each of the time sample values. As result, one obtains corrected time sample values, which no longer have a dc portion.

In the step 502 following thereon, a "windowing" of the dc-cleaned, time discrete, intermediate signal is performed. This means that the values of the time discrete, real signal are weighted with a window function, in order to prevent undesired effects, which are brought about by the limiting of the observation window.

In the next step 503, a Hilbert transformation of the real time-domain signal is performed. With help of the Hilbert transformation, real and imaginary parts of a complex valued signal can be mapped to one another. In the present case, the Hilbert transformation is used in step 503 to produce for the real intermediate frequency signal an associated imaginary part, in order, in this way, to be able to provide a complete complex time-domain signal. This complete, complex valued, time-domain signal serves then as output signal for performing the iterative dispersion correction in the following iterative dispersion correction loop 504.

In parallel with the Hilbert transformation performed in step 503, in step 505, a fast Fourier transformation (Fast Fourier transform, FFT) of the real time-domain signal is performed. As result of the Fourier transformation, one obtains a real time, discrete, frequency spectrum, which includes for each target frequency component contained in the intermediate frequency signal a corresponding frequency peak.

In the following step 506, a peak detection of the peaks in the frequency spectrum is performed. For detecting the peaks in the frequency spectrum, there can, for example, be ascertained, at which locations of the frequency spectrum the frequency sample values lies above a predetermined threshold value. Through comparison of the frequency sample values with a threshold value, the positions of the frequency peaks in the frequency spectrum can be ascertained at least roughly.

Since the peak positions in the frequency spectrum in step 506 have been roughly determined, in the following step 507, a fine determining of the peak positions is performed. For this, in the range of a peak position detected in step 506, a number of frequency support points are inserted, and, for each of these frequency support points, then the associated frequency amplitudes are determined.

Figure 6:
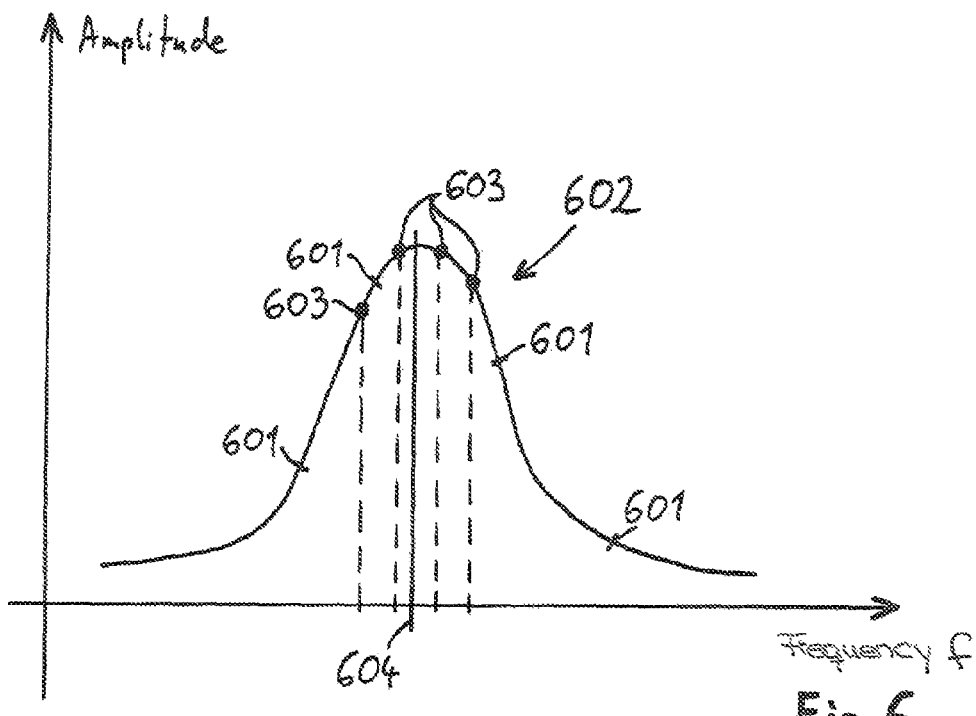
FIG. 6 illustrates a frequency peak in a frequency spectrum, whose peak maximum is to be ascertained.

The principle of this selective refinement of the frequency sampling in the environment of the peak maxima is illustrated in FIG. 6. FIG. 6 shows a section of the frequency spectrum 600, which was obtained as result of the fast Fourier transformation performed in step 505. Plotted along the horizontal axis is the frequency, and along the vertical axis frequency amplitude. Based on the frequency sample values 601 delivered by the FFT in step 505, peak 602 was detected in step 506.

For fine determining of the maximum of the peak 602, in step 507, a number of frequency support points 603 are inserted in the region of the, first of all, only roughly known peak maximum. For each of the frequency support points 603, the associated frequency amplitudes are determined. In such case, for selective determining of the spectral amplitudes at the frequency support points 603, either the discrete Fourier transformation (DFT) can be calculated, or the Goertzel algorithm can be applied.

The Goertzel algorithm enables an efficient calculating of the frequency amplitudes of individual spectral components. Therefore, use of the Goertzel algorithm is especially advantageous, when not the complete frequency spectrum is to be determined, but only a few spectral components at selected frequencies. With help of the Goertzel algorithm, it is especially possible to determine individual frequency amplitudes at certain frequencies with comparatively little computational effort. A description of the Goertzel algorithm is presented, for example, in the textbook "Digital Signal Processing, Principle, Algorithm and Applications", 3$^{rd}$ Edition, John G. Proakis, Dimitris G. Manolakis, Prentice-Hall, Chapter 6, pages 480-481. This short description of the Goertzel algorithm is herewith incorporated by reference into this specification.

With the help of the frequency support points 603 and the associated frequency amplitudes, the curve of the spectrum 600 in the region of the maximum of the peak 602 can be ascertained with high accuracy. For example, first some frequency support points can be inserted in the region of a frequency peak, and at these frequency support points, in each case, the frequency amplitudes determined. In the regions, where the ascertained frequency amplitudes are the highest, then selectively other frequency support points can be inserted for additional refinement of the frequency resolution. The frequency amplitudes are, in each case, determined at these frequency support points. In this way, the exact position 604 of the peak maximum can be determined with high accuracy. Thus, one obtains the target frequency belonging to a certain radar target.

As result of the fine determining of the peak positions in step 507, one obtains the target frequency, from which a first, still not dispersion corrected value $R_1$ of the distance to target can be obtained:

$$R_1 = \frac{f_{target} \cdot v_{const}}{2S} \qquad (29)$$

wherein used as propagation velocity $v_{const}$ is the propagation velocity at the center frequency $f_{center}$. The so ascertained distance R to the target$_1$ is fed to the dispersion correction loop 504.

As indicated in the flow diagram shown in FIG. 5, the fast Fourier transformation in step 505 and the peak detection in step 506 are only performed in advance a single time. This is possible, because the position of the peak undergoes no further significant change as a result of the dispersion correction performed within the dispersion correction loop 504. When $v_{const}$ is selected as $v_{const} = c \cdot \beta_{rel}$ ($f_{center}$) then the dispersion correction does not lead to any significant change in the position of the peak. Therefore, it suffices to perform the fast Fourier transformation 505 and the peak detection 506 a single time in advance. This clearly accelerates the course of the evaluation.

The distance $R_1$ to the target determined in step 507 is fed to the dispersion correction loop 504 and serves as starting point for determining the dispersion correction during the first iteration of the dispersion correction loop 504. In accordance with equation (21), the first phase correction $\phi_{z,corr,1}(t)$ can be written as $$\varphi_{z,corr,1}(t) = 2\pi \frac{2R_1}{c} \cdot \left( \sqrt{(f_0 + St)^2 - \hat{f}_c^2} - \sqrt{f_0^2 - \hat{f}_c^2} \right) - 2\pi \frac{2R_1 \cdot S}{v_{const}} \cdot t \qquad (30)$$

wherein $v_{const} = c \cdot \beta_{rel}(f_{center})$ is the propagation velocity at the center frequency of the frequency ramp.

The dispersion correction $\phi_{z,corr,1}(t)$ calculated in step 508 is applied in the mixer stage 509 to the now complex valued, time discrete, intermediate frequency signal. The phase correction performed in the mixer stage 509 can be written as $$\phi_c(t) = \phi_z(t) - \phi_{z,corr,1}(t) \qquad (31)$$

In such case, $\phi_z(t)$ is the phase of the intermediate signal before the correction, $\phi_{z,corr,1}(t)$ is the phase correction determined in step 508, and $\phi_c(t)$ is the corrected phase of the intermediate signal.

Alternatively to the previously described presentation, in the case of which a phase correction term is added (respectively, subtracted) to the phase of the intermediate signal, the phase correction can also be expressed as a quotient. In such case, the complex valued, measured, intermediate frequency signal is divided by a complex correction signal, in order, in this way, to obtain a phase corrected, intermediate frequency signal. The mixer stage 509 shown in FIG. 5 is embodied to perform this complex valued division and to produce a dispersion corrected, complex signal, whose phase is corrected corresponding to dispersion effects calculated in step 508.

For this dispersion corrected, intermediate frequency signal in the following step 510, again a fine determining of the peak positions is performed, in order based on the dispersion corrected signal to determine the target frequency components and the distance to target. In such case, it is not necessary within the dispersion correction loop 504 to perform a renewed Fourier transformation and a renewed peak detection. Since in determining the dispersion correction the propagation velocity at the center frequency $f_{center}$ of the frequency ramp was used as propagation velocity $v_{const}$, it can be assumed therefrom that the position of the frequency peak in the frequency spectrum is not significantly changed by applying the dispersion correction in the mixer stage 509. Therefore, within the dispersion correction loop 504 a renewed performing of the Fourier transformation and the following peak detection be can omitted. It can be assumed therefrom that the approximate peak positions ascertained in step 506 are still appropriate. Therefore, a fine determining of the peak positions can be directly performed within the dispersion correction loop 504 in step 510. This fine determining of the peak positions in the frequency spectrum is again performed corresponding to the procedure illustrated in FIG. 6. In the vicinity of the peak position already approximately known from step 506, a number of frequency support points 603 are inserted, and, for each of these frequency support points 603, based on the dispersion corrected time-domain signal, in each case, the associated frequency amplitude is newly calculated. For calculating the frequency amplitudes at the frequency support points 603, for example, a discrete Fourier transformation (DFT) can be performed, or else the Goertzel algorithm used.

Since within the phase correction loop 504 a complex valued, signal processing is performed, it is advantageous for determining the frequency amplitudes at the frequency support points 603 to use the "generalized Goertzel algorithm", which, starting from a complex valued, time-domain signal, delivers for a certain frequency support point a complex valued, frequency amplitude. The complex valued, time-domain signal is thus converted into complex valued, frequency amplitudes. The generalized Goertzel algorithm delivers, consequently, supplementally to the magnitude of the frequency amplitudes, also associated phase information. This phase information for the individual frequency amplitudes can be used in the context of a phase evaluation for exact setting of the frequency of the peak maximum, such as will be described below. An explanation of the generalized Goertzel algorithm is presented in the article "Goertzel-Algorithm Generalized to Non-Integer Multiples of Fundamental Frequency", Sysel and Rajmic, EURASIP Journal on Advances in Signal Processing, 2012: 56, which is herewith incorporated by reference.

Based on the frequency amplitudes ascertained for the individual frequency support points 603, the exact position 604 of the peak maximum of the dispersion corrected peak 602 can then be determined. The frequency of the peak maximum is the target frequency for a certain target. The so ascertained target frequency can then be converted with the assistance of equation (28) into a distance $R_2$ to the target.

In the following step 511, it is ascertained whether the value $R_2$ of the distance to the target is already sufficiently exact or whether still more iterations of the dispersion correction loop 504 should be run, in order to obtain a yet more exact value for the distance to target. For example, it can be queried in step 511, whether the difference between the currently ascertained distance to target and the distance to target of an earlier iteration is greater than a predetermined epsilon. So long as the difference still exceeds the predetermined epsilon, the iteration is continued. As soon as the difference subceeds the predetermined epsilon, the value of the distance to target no longer changes significantly with further iterations, and the iteration loop can be interrupted.

The iterations within the dispersion correction loop 504 are performed, until both the distance R to the target as well as also the phase correction $\phi_{z,corr}(t)$ are sufficiently exactly determined. In the first pass through, the first phase correction $\phi_{z,corr,1}(t)$ was ascertained in step 508 based on the distance $R_1$ and applied to the intermediate frequency signal. By evaluation of the phase corrected, intermediate signal, then the more exact distance $R_2$ to the target was ascertained. Based on $R_2$, then in a further iteration in step 508 a yet more exact phase correction $\phi_{z,corr,2}(t)$ was determined and applied to the intermediate frequency signal. Based on the so phase corrected, intermediate signal, then a third, still more accurate target distance value $R_3$ was determined, etc.

The iterations are continued, until in step 511 it is found that the ascertained distance to target no longer changes significantly. In this case, both the distance to target as well as also the phase correction have converged to their ultimate values.

In the following, optional step 512, a phase evaluation can be supplementally performed, in order to determine the distance with yet greater accuracy. In the case of this phase evaluation, one makes use of the fact that the generalized Goertzel algorithm supplementally to the frequency amplitudes at the respective frequency support points also delivers a phase. Thus, for the frequency amplitude at the peak maximum of a frequency peak, also the associated phase is known. By comparing this phase at the peak maximum with an earlier ascertained or calculated desired value of the phase, this phase information can be converted into distance information.

As result of the flow diagram shown in FIG. 5, one obtains a precisely determined distance 513 to the surface of the medium or to another radar target in the pipe.

In the case of the flow diagram shown in FIG. 5, the computationally intensive Fourier transformation as well as the following peak detection are performed in advance only a single time in steps 505 and 506. In this way, both the calculative effort as well as also the time spent in the distance determination are greatly reduced, and the distance value is available with high accuracy in a short amount of time. Especially, in the case of the flow diagram shown in FIG. 5, it is not necessary, to perform a fast Fourier transformation within the dispersion correction loop 504. Since the peaks in the frequency spectrum only shift very slightly, it is sufficient to perform a selective determining of the frequency amplitudes at selected frequency support points by means of DFT or by means of the Goertzel algorithm. The time consumed for such calculating is essentially less than the time that would be consumed for performing a complete Fourier transformation.

A further advantage of the flow diagram shown in FIG. 5 is that within the dispersion correction loop 504 only a small number of iterations is required to determine the final dispersion correction, respectively the final value of the distance. This small number of iterations is mainly attributable to the fact that a dispersion correction performed for the propagation velocity $v_{const}=c \cdot \beta_{rel}(f_{center})$ leaves the positions of the frequency peaks in the frequency spectrum largely unchanged. The small number of iterations significantly lessens the calculative effort and therewith also the time spent for determining the distance clearly, so that a more precise distance value can be available even after a small number of iterations. Especially with the assistance of the flow diagram shown in FIG. 5, fill level measurement in a sounding pipe can achieve an accuracy of measurement in the submillimeter range.

Simplified Evaluation

In many cases, even a single iteration is sufficient to determine the distance with adequate accuracy. When only a single iteration of the dispersion correction loop 504 is performed, the flow diagram shown in FIG. 7 results. Starting point is again the intermediate frequency signal 211. In the optional step 700 first of all, an ensemble averaging is performed, wherein the measured values obtained for a number of frequency ramps are averaged. Then, in step 701, the dc portion of the measured values is removed, and, in step 702, a window function is applied to the measured values. By means of the Hilbert transformation performed in step 703, the real valued signal is transformed to a complex valued signal. Additionally, in step 704, a fast Fourier transformation of the intermediate signal is performed, and one obtains as a result the frequency spectrum of the intermediate signal. In the following step 705, the frequency peaks in the frequency spectrum are detected. In step 706, a fine determining of the frequency peaks in the frequency spectrum is performed. In this regard, first of all, some frequency support points are inserted in the region of the peak maximum, and at these frequency support points then, in each case, by means of discrete Fourier transformation or by means of the Goertzel algorithm, the particular associated frequency amplitudes are ascertained. From the peak maximum one obtains with the assistance of equation (29) a first value for the distance of the respective radar target, which then is taken into consideration in the following step 707 for calculating a dispersion correction. In the mixer 708, the now complex valued, intermediate frequency signal is corrected corresponding to the dispersion correction determined in step 707, and one obtains a dispersion corrected signal. In step 709, in turn, a fine determining of the frequency peaks in the frequency spectrum of the now dispersion corrected signal is performed. For this, in turn, the respective frequency amplitudes at some frequency support points in the region of the frequency peak are determined, and based on these frequency amplitudes then the particular peak maximum of a frequency peak can be ascertained. From that information, then the distance to the respective radar target can be derived. In the optional step 710, a phase evaluation can be performed, in order, by taking the phase information into consideration, to determine the distance with still further improved accuracy. As a result of the flow diagram shown in FIG. 7, one obtains the distance or distances 711 to the one or more radar targets in the pipe.

Refinement of the Frequency Spectrum by Introducing Frequency Support Points

There are different options for introducing frequency support points, wherein in the following three of these options will be described in greater detail.

In a first option, some frequency support points are first inserted, and at these frequency support points the respective frequency amplitudes determined by means of DFT or by means of the Goertzel algorithm. Then, in the region of a frequency peak, for improving the frequency resolution, in each case, in the middle between two neighboring frequency support points, another frequency support point is inserted. By continued interval halving, the resolution of the frequency spectrum can be refined as much as desired.

In a second option, the frequency intervals between neighboring frequency support points are asymmetrically divided by introducing further frequency support points, wherein as division ratio, for example, the golden ratio represents a possibility. Through a continued interval subdivision corresponding to the golden ratio, likewise any desired resolution of the frequency spectrum can be achieved.

In a third option, for determining the peak frequency, the "method of Brent" is applied. The "method of Brent" is described, for example, in Chapter 10.2 of the standard work "Numerical Recipes in C: The Art of Scientific Computing", William H. Press, 2nd ed. 1992. First, at least three frequency support points are inserted in the region of a frequency peak, and at these frequency support points the respective frequency amplitudes are determined by means of DFT or by means of the Goertzel algorithm. Then, a first approximating parabola is placed through these points to approximate the curve of the spectrum in the vicinity of the peak maximum. The peak of this approximating parabola is inserted as an additional frequency support point, which is taken into consideration for determining a second approximating parabola. The second approximating parabola approximates the curve of the spectrum in the vicinity of the peak maximum with yet greater accuracy. In this way, the peak frequency can be won as the peak of a series of converging, approximating parabolas.

Figure 8A:
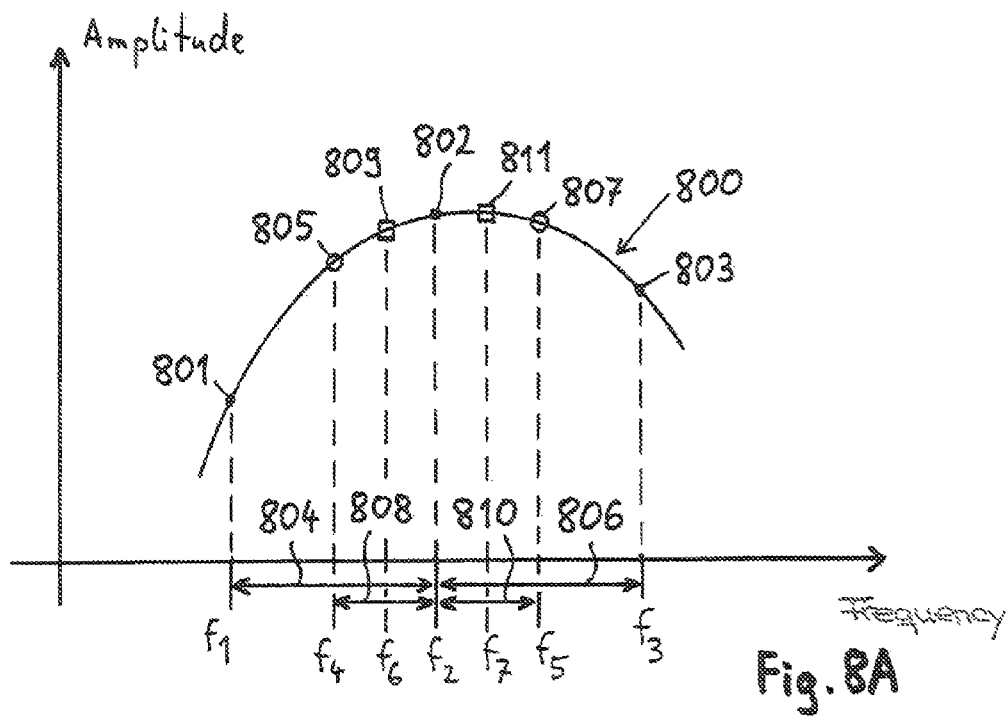
FIG. 8A illustrates an approach for ascertaining the peak maximum by continued interval halving.

FIG. 8A illustrates the method of continued interval halving by way of example. FIG. 8A shows a peak 800 of the frequency spectrum. Plotted along the horizontal axis is frequency, and along the vertical axis frequency amplitude. First, three frequency support points 801, 802, 803 are inserted at the frequencies $f_1$, $f_2$ and $f_3$, and at these frequency support points, in each case, the frequency amplitude is determined by means of DFT or by means of the Goertzel algorithm. This relatively coarse frequency raster is then divided further by the introduction of further frequency support points. For this, the frequency interval 804 between the frequencies $f_1$ and $f_2$ is divided centrally, in order, in this way, to define another frequency support point $f_4$. The frequency amplitude belonging to the frequency $f_4$ is determined by means of DFT or by means of the Goertzel algorithm. In this way, one obtains the point 805 of the frequency spectrum. Likewise the frequency interval 806 between the frequency $f_2$ and the frequency $f_3$ is centrally divided, in order, in this way, to define another frequency support point $f_5$. The frequency amplitude belonging to the frequency $f_5$ is determined by means of DFT or by means of the Goertzel algorithm. In this way, one obtains the point 807 of the frequency spectrum. From the previously found five points 801, 805, 802, 807, 803, then the three neighboring points with the highest frequency amplitudes are selected. In the example of FIG. 8A, these are the three points 805, 802 and 807. For additional refinement of the frequency spectrum, the frequency interval 808 between the frequencies $f_4$ and $f_2$ is centrally divided, in order, in this way, to define another frequency support point $f_6$. The frequency amplitude for frequency $f_6$ is determined by means of DFT or by means of the Goertzel algorithm, and one obtains the point 809. Likewise the frequency interval 810 between the frequencies $f_2$ and $f_5$ is centrally divided, and as a result of this interval halving one obtains the other frequency support point $f_7$. The frequency amplitude for frequency $f_7$ is determined by means of DFT or by means of the Goertzel algorithm, and one obtains the point 811. As soon as a desired resolution of the frequency spectrum is achieved, the interval halving is stopped. Output as peak frequency is then the frequency of that point, for which the highest frequency amplitude was ascertained thus far.

In the second method for continued interval subdivision, the frequency intervals between neighboring points in the vicinity of a peak are, in each case, divided asymmetrically corresponding to a predetermined division ratio. For example, the frequency intervals can be divided according to the golden ratio. By asymmetric subdividing, other frequency support points are defined, and the frequency amplitudes at these frequency support points are determined by means of DFT or by means of the Goertzel algorithm. The neighboring points with the highest frequency amplitudes serve as a basis for the next iteration. By asymmetric subdividing of the frequency intervals, the convergence behavior can in some cases be influenced positively.

Figure 8B:
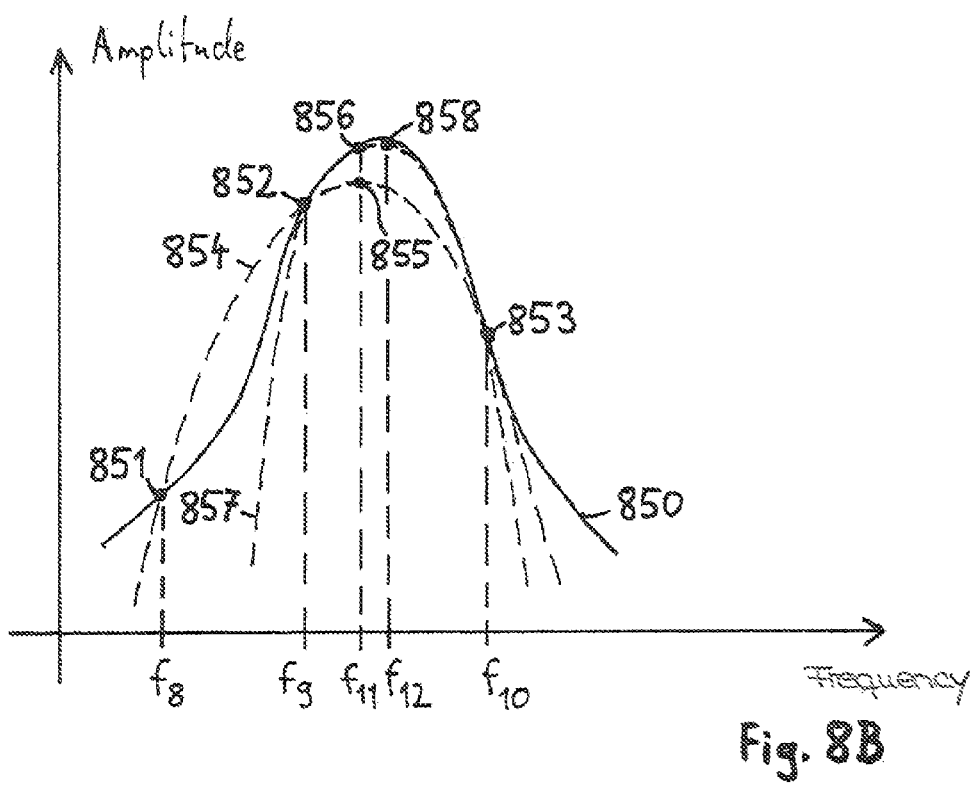
FIG. 8B illustrates the method of Brent for approximating a peak in the vicinity of a peak maximum with the assistance of parabolas.

FIG. 8B shows how with the assistance of the "method of Brent", the maximum of a peak in the frequency spectrum can be determined. The "method of Brent" is described, for example, in Chapter 10.2 of the standard work "Numerical Recipes in C: The Art of Scientific Computing", William H. Press, 2nd ed. 1992 and such work is incorporated herewith by reference.

FIG. 8B shows a peak 850 of the frequency spectrum. Plotted along the horizontal axis is frequency, and along the vertical axis frequency amplitude. First, three frequency support points 851, 852, 853 are inserted at the frequencies $f_8$, $f_9$, $f_{10}$, and at these frequency support points, in each case, frequency amplitude is determined by means of DFT or by means of the Goertzel algorithm. In the first step of the method of Brent, the peak 850 is approximated by a first approximating parabola 854, which is fixed by the frequency support points 851, 852, 853 and the associated frequency amplitudes. The first approximating parabola 854 has its peak 855 at the frequency $f_{11}$. This frequency $f_{11}$ of the peak 855 is used as another frequency support point for the next iteration of the parabolic approximation. In this regard, the frequency amplitude at the additional frequency support point $f_{11}$ is calculated by means of DFT or by means of the Goertzel algorithm. In this way, one obtains the point 856 of the frequency spectrum. For the next iteration, then the three frequency support points 852, 856, 853 of the spectrum are used, which have the highest frequency amplitudes ascertained so far. By these three frequency support points 852, 856, 853 and the associated frequency amplitudes, a second approximating parabola 857 is fixed, which approximates the curve of the peak 850 in the vicinity of the peak maximum yet better than the first approximating parabola 854. The second approximating parabola 857 has its peak 858 at the frequency $f_{12}$. Frequency $f_{12}$ could already be considered as a sufficiently more exact, approximate value for the peak maximum. In case the accuracy is considered to be sufficient, one would terminate the calculating at this position. Alternatively thereto, one could improve the accuracy, in given cases, yet further by using the frequency $f_{12}$ of the peak 858 as another frequency support point for another iteration of the parabolic approximation.

The advantage of the method of Brent is that the curve of a peak in the vicinity of its maximum in any event resembles a parabola and the curve of the peak in the vicinity of the peak maximum can be approximated quite well by an approximating parabola. When one approximates the peak curve by a series of approximating parabolas, these approximating parabolas converge, consequently, very quickly.

Performing a Phase Evaluation

It has already been discussed above that for determining the peak maximum of the frequency peak in the frequency spectrum, in each case, some frequency support points are inserted and at these frequency support points then the associated frequency amplitudes are ascertained, wherein the generalized Goertzel algorithm can be taken into consideration for determining the frequency amplitudes. The generalized Goertzel algorithm delivers supplementally to the frequency amplitude also a phase. This additional phase information can be used to improve the accuracy of the distance determination yet further by means of a phase evaluation.

FIG. 9 illustrates how a phase evaluation is performed. Plotted along the horizontal axis is the distance to the target in meters, and along the vertical axis the phase of the considered frequency component in the frequency spectrum in rad. FIG. 9 shows the desired curve 900 of the phase of the considered frequency component in the intermediate frequency signal as a function of distance to target. As is visible, the desired curve 900 has a sawtooth form.

By determining the peak maximum of the considered frequency peak in the frequency spectrum, obtained, on the one hand, is a distance to target 901 and, on the other hand, an associated phase 902. As illustrated by the arrow 903, then the point 904 on the desired curve of the phase 900 belonging to the phase 902 is found. It is thus asked, which point 904 on the desired curve 900 of the phase would deliver the ascertained phase 902. The distance to target 905 belonging to this point 904 is considered a better and more believable value of the distance to target them the original value 901 of the distance to target. In other words, the phase of the peak maximum is more trustworthy than the frequency of the peak maximum. The phase evaluation delivers thus an improved value 905 of the distance to target.

The invention claimed is:

1. A method for determining distance to a surface of a medium or to another radar target in a pipe by means of a radar measurement apparatus, which works according to the principle of FMCW radar, wherein the method comprises:
   a) transmitting within the pipe a radar transmission signal frequency modulated according to the FMCW principle;
   b) receiving a radar received signal reflected on the surface of the medium or on the other radar target in the pipe back to the radar measurement apparatus;
   c) mixing the radar received signal with the radar transmission signal or a signal derived therefrom and producing an intermediate signal;
   d) determining a frequency spectrum of the intermediate signal or a signal derived therefrom by means of fast Fourier transformation and detecting the position of the frequency peak in the frequency spectrum;
   e) determining a dispersion correction for removing, respectively lessening, dispersion effects, applying the dispersion correction to the intermediate frequency signal or to a signal derived therefrom and producing a dispersion corrected signal; and
   f) determining the position of the frequency peak in the frequency spectrum of the dispersion corrected signal anew by:
      f1) introducing a number of frequency support points in the region of the frequency peak detected in step d);
      f2) determining the respective frequency amplitudes selectively at the newly introduced frequency support points by means of discrete Fourier transformation or by means of the Goertzel algorithm; and f3) ascertaining the position of the frequency peak in the frequency spectrum of the dispersion corrected signal using the frequency amplitudes at the newly introduced frequency support points and deriving the distance to the surface of the medium or to the other radar target in the pipe from the position of the frequency peak in the frequency spectrum.

2. The method as claimed in claim 1, wherein:
the dispersion correction is a phase correction, which, on the one hand, lessens or eliminates a dispersion dependent, phase fraction in the phase-time curve of the intermediate signal and, on the other hand, adds a phase fraction independent of dispersion effects to the phase-time curve of the intermediate signal.

3. The method as claimed in claim 1, wherein:
dispersion correction depends on the distance to the surface of the medium or to the other radar target in the pipe.

4. The method as claimed in claim 1, wherein:
a propagation velocity of the radar transmission signal in the pipe at a center frequency of the frequency ramp of the radar transmission signal is used for determining the dispersion correction.

5. The method as claimed in claim 4, wherein:
at least one of the following:
the center frequency is determined by $$f_{center} = f_0 + S \cdot \frac{T_0}{2},$$

wherein $f_0$ is the starting frequency of the frequency ramp, S is the slope of the frequency ramp and $T_0$ is the modulation period length of the radar transmission signal; and
in the case of determining the dispersion correction, choosing the propagation velocity at the center frequency of the frequency ramp has the result that the dispersion correction changes the positions of the frequency peaks in the frequency spectrum only insignificantly.

6. The method as claimed in claim 1, wherein:
at least one of the following:
the dispersion correction includes a dispersion dependent term, which is designed to lessen or to remove the dispersion dependent, phase fraction in the phase-time curve of the intermediate signal;
the dispersion correction includes a dispersion dependent term, which is designed to lessen or to remove the dispersion dependent, phase fraction in the phase-time curve of the intermediate signal, wherein the dispersion dependent term of the dispersion correction has the following form:

$$2\pi \frac{2R}{c} \cdot \left( \sqrt{(f_0 + St)^2 - \hat{f}_c^2} - \sqrt{f_0^2 - \hat{f}_c^2} \right),$$

wherein R is the distance to the surface of the medium or to the other radar target in the pipe, wherein c is the speed of light in air, wherein $f_0$ is the starting frequency of the frequency ramp and S is the slope of the frequency ramp of the radar transmission signal, and wherein $\hat{f}_c$ is the cutoff frequency of a dominating mode in the pipe;
the non-dispersion effect dependent phase fraction, which is added by the dispersion correction, rises linearly with time;
the non-dispersion effect dependent phase fraction, which is added by the dispersion correction, depends on the distance to the surface of the medium or to the other radar target in the pipe;
the dispersion correction includes a non-dispersion dependent term, which is designed to add the non-dispersion effect dependent phase fraction to the phase-time curve of the intermediate signal, wherein the non-dispersion effect dependent phase fraction rises linearly with time;
the dispersion correction includes a non-dispersion dependent term, which is designed to add the non-dispersion effect dependent phase fraction to the phase-time curve of the intermediate signal, wherein the non-dispersion effect dependent phase fraction depends on the distance to the surface of the medium or to the other radar target in the pipe; and
the dispersion correction includes a non-dispersion dependent term, which is designed to add the non-dispersion effect dependent phase fraction to the phase-time curve of the intermediate signal, wherein the non-dispersion dependent term of the dispersion correction has the following form:

$$-2\pi \frac{2RS}{v_{const}} \cdot t,$$

wherein R is the distance to the surface of the medium or to the other radar target in the pipe, wherein S is the slope of the frequency ramp of the radar transmission signal, and wherein $v_{const}$ is a propagation velocity of the radar transmission signal and is freely determinable.

7. The method as claimed in claim 1, wherein:
step d) is performed only a single time in advance.

8. The method as claimed in claim 1, wherein:
steps e) and f) are repeated in alternating dependence until the distance to the surface of the medium or to the other radar target in the pipe is determined with a predetermined accuracy.

9. The method as claimed in claim 1, wherein:
introducing some frequency support points into the region of the detected frequency peak;
determining the associated frequency amplitudes at these frequency support points by means of discrete Fourier transformation or by means of the Goertzel algorithm;
introducing additional frequency support points for additional refinement of the frequency resolution in the frequency ranges, in which the frequency amplitudes are highest; and
determining the associated frequency amplitudes at the additional frequency support points by means of discrete Fourier transformation or by means of the Goertzel algorithm.

10. The method as claimed in claim 9, wherein:
introducing additional frequency support points and determining the associated frequency amplitudes are repeated a number of times for determining the position of the peak maximum.

11. The method as claimed in claim 1, wherein:
the position of the peak maximum of the frequency peak is determined based on the frequency amplitudes at at least three frequency support points in the region of a frequency peak by means of parabolic interpolation according to the method of Brent.

12. The method as claimed in claim 1, wherein:
the frequency amplitudes at the newly introduced frequency support points are determined, in each case, by means of the generalized Goertzel algorithm; and
the generalized Goertzel algorithm delivers a phase supplementally to the magnitude of the frequency amplitude.

13. The method as claimed in claim 12, wherein:
the phase delivered by the generalized Goertzel algorithm for each newly introduced frequency support point is used to determine the phase at the peak maximum of a frequency peak.

14. The method as claimed in claim 12, wherein:
a desired phase-time curve of frequency amplitude is determined or calculated as a function of distance to the surface of the medium or to the other radar target in the pipe; and
with the assistance of this desired phase-time curve the phase at the peak maximum of a frequency peak is converted into a more exact value of the distance to the surface of the medium or to the other radar target in the pipe.

15. The method as claimed in claim 1, wherein:
the medium is a liquid or bulk good;
the pipe is a sounding pipe or detour pipe;
the method is applied to determine from the distance to the surface of the medium a fill level of the medium in the pipe;
the method is applied in a radar measuring device for determining the distance of radar targets by means of FMCW radar;
the method is applied in a fill-level measuring device for determining a fill level by means of FMCW radar; and
the method is applied in the context of a fill level measurement by means of FMCW radar, in order to determine fill level in a container or tank.

16. A radar measurement apparatus for determining distance to a surface of a medium or to another radar target in a pipe, wherein the radar measurement apparatus works according to the FMCW principle, and comprises:
a radar transmitting/receiving unit, which is designed to produce a radar transmission signal, which is frequency modulated according to the FMCW principle, to receive a radar received signal reflected back on the surface of the medium or on the other radar target in the pipe, to convert the radar received signal into an intermediate frequency signal by mixing with the radar transmission signal or a signal derived therefrom and based on the so obtained intermediate signal to determine a distance to the surface of the medium or to the other radar target in the pipe;

wherein:
the radar measurement apparatus is designed,
to determine by means of fast Fourier transformation a frequency spectrum of the intermediate signal or a signal derived therefrom and to detect the position of the frequency peak in the frequency spectrum;
to determine a dispersion correction for removing, respectively lessening, dispersion effects, to apply the dispersion correction to the intermediate frequency signal or to a signal derived therefrom and to produce a dispersion corrected signal; and
to determine the position of the frequency peak in the frequency spectrum of the dispersion corrected signal anew by introducing a number of frequency support points in the region of the detected frequency peak, by determining the respective frequency amplitudes selectively at the newly introduced frequency support points by means of discrete Fourier transformation or by means of the Goertzel algorithm, by ascertaining the position of the frequency peak in the frequency spectrum of the dispersion corrected signal using the frequency amplitudes at the newly introduced frequency support points and by deriving the distance to the surface of the medium or to the other radar target in the pipe from the position of the frequency peak in the frequency spectrum.

17. The radar measurement apparatus as a claimed in claim 16, wherein:
the medium is a liquid or bulk good;
the pipe is a sounding pipe or detour pipe;
the radar measurement apparatus is designed to determine from the distance to the surface of the medium a fill level of the medium in the pipe;
the radar measurement apparatus is embodied as a field device, which is connectable via a fieldbus with a control unit; and
the radar measurement apparatus is a fill-level measuring device for process automation.

* * * * *